United States Patent
Globe et al.

(10) Patent No.: US 9,652,798 B2
(45) Date of Patent: May 16, 2017

(54) SYSTEMS AND METHODS FOR IDENTIFYING PRODUCT RECOMMENDATIONS BASED ON INVESTMENT PORTFOLIO DATA

(71) Applicant: The Toronto-Dominion Bank, Toronto (CA)

(72) Inventors: Michael E. Globe, Toronto (CA); Mazin Al-Samadi, Burlington (CA); Lauren Van Heerden, Bedford, NH (US); Gunalan Nadarajah, Milton (CA); Orin Del Vecchio, Richmond Hill (CA); Michael D. Cummins, Pickering (CA); Prabaharan Sivashanmugam, Farmington Hills, MI (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 14/510,920

(22) Filed: Oct. 9, 2014

(65) Prior Publication Data
US 2015/0100404 A1 Apr. 9, 2015

Related U.S. Application Data

(60) Provisional application No. 61/888,641, filed on Oct. 9, 2013.

(51) Int. Cl.
*G06Q 30/06* (2012.01)
*G06Q 30/02* (2012.01)
*G06Q 40/06* (2012.01)

(52) U.S. Cl.
CPC ..... *G06Q 30/0631* (2013.01); *G06Q 30/0226* (2013.01); *G06Q 40/06* (2013.01)

(58) Field of Classification Search
CPC ..................................................... G06Q 30/06
(Continued)

(56) References Cited

U.S. PATENT DOCUMENTS 6,525,997 B1 * 2/2003 Narayanaswami et al. .. 368/223
6,609,110 B1 8/2003 Dowd et al.
(Continued)

FOREIGN PATENT DOCUMENTS

WO WO 2013052081 4/2013

OTHER PUBLICATIONS

"Augmented reality makes shopping more personal." IBM Research. N.p., May 17, 2011. (https://www.research.ibm.com/articles/augmented-reality.shtml).*
(Continued)

*Primary Examiner* — Jeffrey A Smith
*Assistant Examiner* — Jennifer Lee
(74) *Attorney, Agent, or Firm* — Duane Morris LLP

(57) ABSTRACT

The disclosed embodiments include, for example, systems and methods for providing recommendations of one or more alternative products to a user based on investment portfolio data. In one aspect, the disclosed embodiments may include a system that is configured to obtain information associated with one or more products of interest to the user. In certain aspects, the obtained information may identify a product previously purchased by the user, one or more products that form a shopping list of the user, and/or a product identified by the user as a potential purchase. The system may be configured to identify one or more alternative products that are similar to the products of interest and that are related to one or more securities associated with an investment portfolio of the user. In one aspect, the system may be configured
(Continued)

to generate one or more instructions to transmit information identifying the one or more alternatives product to a device of the user.

30 Claims, 7 Drawing Sheets

(58) Field of Classification Search
USPC .................................................. 705/26.1–27.2
See application file for complete search history.

(56) References Cited

U.S. PATENT DOCUMENTS

| | | |
|---|---|---|
| 6,826,541 B1 | 11/2004 | Johnston et al. |
| 6,999,938 B1 | 2/2006 | Libman |
| 7,198,192 B2 | 4/2007 | Page et al. |
| 7,401,731 B1 | 7/2008 | Pletz et al. |
| 7,580,875 B1 | 8/2009 | Finn et al. |
| 7,783,528 B2 | 8/2010 | Musgrove et al. |
| 7,818,233 B1 | 10/2010 | Sloan et al. |
| 7,908,163 B2 | 3/2011 | Malewicz |
| 7,908,183 B2 | 3/2011 | Jacobi et al. |
| 7,945,484 B1* | 5/2011 | Tam et al. .................. 705/26.41 |
| 8,160,936 B2 | 4/2012 | Ali et al. |
| 8,219,584 B2 | 7/2012 | Starr |
| 8,301,515 B2 | 10/2012 | Chowdhary et al. |
| 8,326,728 B1 | 12/2012 | Devaney et al. |
| 8,417,608 B2 | 4/2013 | Benefield |
| 8,452,653 B1 | 5/2013 | Gottfurcht et al. |
| 8,538,829 B1 | 9/2013 | Hu et al. |
| 2001/0014868 A1 | 8/2001 | Herz et al. |
| 2003/0036376 A1 | 2/2003 | Annan et al. |
| 2003/0212621 A1 | 11/2003 | Poulter et al. |
| 2004/0176966 A1 | 9/2004 | Chen |
| 2004/0254873 A1* | 12/2004 | Loveland ....................... 705/36 |
| 2005/0165706 A1 | 7/2005 | Giacchetti |
| 2006/0286518 A1 | 12/2006 | Yoder |
| 2007/0033098 A1 | 2/2007 | Peters et al. |
| 2007/0100704 A1 | 5/2007 | Liu et al. |
| 2007/0233585 A1 | 10/2007 | Ben Simon et al. |
| 2007/0257792 A1 | 11/2007 | Gold |
| 2007/0265926 A1 | 11/2007 | Ohmann et al. |
| 2008/0033852 A1 | 2/2008 | Granger et al. |
| 2008/0046382 A1 | 2/2008 | Metz |
| 2008/0208630 A1 | 8/2008 | Fors et al. |
| 2009/0150925 A1 | 6/2009 | Henderson |
| 2010/0023340 A1 | 1/2010 | Chowdhary et al. |
| 2010/0082455 A1 | 4/2010 | Rosenblatt et al. |
| 2010/0100424 A1 | 4/2010 | Buchanan et al. |
| 2010/0180009 A1 | 7/2010 | Callahan |
| 2010/0262554 A1 | 10/2010 | Elliott |
| 2011/0106624 A1 | 5/2011 | Bonner et al. |
| 2011/0153520 A1 | 6/2011 | Chen et al. |
| 2011/0173134 A1 | 7/2011 | Mabbitt |
| 2011/0178889 A1* | 7/2011 | Abraham et al. ............ 705/26.1 |
| 2011/0191417 A1 | 8/2011 | Rathod |
| 2011/0246214 A1 | 10/2011 | Yarvis et al. |
| 2011/0270780 A1 | 11/2011 | Brooks et al. |
| 2012/0030227 A1 | 2/2012 | Mital et al. |
| 2012/0072851 A1 | 3/2012 | Stern |
| 2012/0123674 A1 | 5/2012 | Perks |
| 2012/0209749 A1 | 8/2012 | Hammad et al. |
| 2012/0330861 A1 | 12/2012 | Carpenter et al. |
| 2013/0097664 A1 | 4/2013 | Herz et al. |
| 2013/0166366 A1 | 6/2013 | Allen |
| 2013/0191213 A1 | 7/2013 | Beck et al. |
| 2013/0196297 A1 | 8/2013 | Anwar |
| 2013/0198030 A1* | 8/2013 | Linden et al. ............... 705/26.7 |
| 2013/0226829 A1 | 8/2013 | Rose et al. |
| 2013/0232030 A1 | 9/2013 | Gockeler et al. |
| 2013/0238460 A1 | 9/2013 | Green |
| 2013/0290905 A1 | 10/2013 | LuVogt et al. |
| 2014/0067547 A1 | 3/2014 | Park |
| 2014/0207604 A1 | 7/2014 | Morgan |
| 2014/0209687 A1 | 7/2014 | Cancro et al. |
| 2014/0214618 A1* | 7/2014 | Pedley .............. G06Q 30/0623 705/26.61 |
| 2014/0214623 A1 | 7/2014 | Cancro et al. |
| 2014/0280143 A1 | 9/2014 | Milenova et al. |
| 2014/0363059 A1 | 12/2014 | Hurewitz |

OTHER PUBLICATIONS

O'Conner, "Want to Boycott Koch Brothers' Products While Shopping? There's an App for That." Jun. 18, 2012 (6 pages).

"Starmount Enriches the In-Store Shopping Experience with the Introduction of Starmount Connect," Wireless News, Jan. 19, 2012 (2 pages).

Wang, "Design of Trustworthy Online Recommendation Agents: Explanation Facilities and Decision Strategy Support." The University of British Columbia, 2005 (205 pages).

Shopwell, "Your Personal Nutrition Expert," http://www.shopwell.com, Oct. 30, 2013 (2 pages).

Jon, "Using Everyday Purchases to Find Stock Investments," novelinvestor.com, Dec. 17, 2012 (9 pages).

"Engage3TM Unveils Mobile Shopping App, ShoppingScout™, that Saves Consumers Money on Groceries and Everyday Shopping Items," PRWEB, Oct. 24, 2013 (2 pages).

* cited by examiner

SYSTEMS AND METHODS FOR IDENTIFYING PRODUCT RECOMMENDATIONS BASED ON INVESTMENT PORTFOLIO DATA

CROSS-REFERENCE TO RELATED APPLICATIONS

This application claims the benefit of priority to U.S. Provisional Patent Application No. 61/888,641, filed Oct. 9, 2013, the entire disclosure of which is expressly incorporated herein by reference to its entirety.

BACKGROUND

Technical Field

The present disclosure generally relates to computerized systems and methods for steering customer behavior, and more particularly, and without limitation, to computerized systems and methods that may identify and provide recommendations of products based on investment portfolio data.

Background Information

New investors are often discouraged by the limited level of interaction and engagement available through websites and other investment tools provided by the financial institutions. While the discouragement may result from a general lack of interest in investing, real or perceived barriers can prevent these new investors from fully understanding the composition of their investment portfolio and the various investment opportunities provided by their financial institutions.

In many instances, the barriers result from a new investor's inability to connect a daily decision, such as a purchase of cereal or bathroom tissue at the grocery store, with a performance of a security held within his or her investment portfolio. For example, an investor may regularly purchase Ben & Jerry's™ ice cream, but may be unaware that his or her investment portfolio includes stock of Unilever™, which owns Ben & Jerry's™. The complex nature of financial instruments commonly held in investment portfolios (e.g., mutual funds and exchange-traded funds (ETFs)) further complicates the linkage between the investor's everyday purchases and a performance of his or her investment portfolio. Moreover, even assuming the investor could appreciate the impact of an everyday purchase on an investment portfolio, the investor would be challenged to monitor this impact over time due to the constantly changing composition of the investment portfolio and to changes in the corporate structure of manufacturers of consumer products.

SUMMARY OF THE INVENTION

The disclosed embodiments include computerized methods and systems for identifying one or more alternatives to products based on relationships with securities within an investment portfolio of a user, and for transmitting information identifying the alternative products to a device of the user.

The disclosed embodiments include, for example, a system having a storage device and at least one processor coupled to the storage device. The storage device may store software instructions for controlling the at least one processor when executed by the at least one processor. In one embodiment, the at least one processor may be operative with the software instructions and may be configured to obtain (i) first information identifying at least one product and (ii) second information identifying securities associated with an investment portfolio of the user. In some aspects, the at least one product may be associated with a plurality of product parameters. The at least one processor may be further configured to identify an alternative product associated with at least one of the product parameters and at least one of the securities, and identify a retailer that offers the alternative product for sale based on transaction data identifying prior purchase transactions involving the alternate product. The at least one processor may be further configured to generate a first electronic command to transmit information identifying the alternative product and the retailer for presentation on a device of the user.

The disclosed embodiments also include a computer-implemented method that obtains, using at least one processor, (i) first information identifying at least one product and (ii) second information identifying securities associated with an investment portfolio of the user. In some aspects, the at least one product is associated with a plurality of product parameters. The method also includes identifying, using the at least one processor, an alternative product associated with at least one of the product parameters and at least one of the securities, and identifying, using the at least one processor, a retailer that offers the alternative product for sale based on transaction data identifying prior purchase transactions involving the alternate product. In additional embodiments, the method includes generating, using the at least one processor, a first electronic command to transmit information identifying the alternative product and the retailer for presentation on a device of the user.

Other embodiments of the present disclosure relate to a tangible, non-transitory computer-readable medium storing instructions that, when executed by at least one processor, perform a method that includes obtaining (i) first information identifying at least one product and (ii) second information identifying securities associated with an investment portfolio of the user. In some aspects, the at least one product is associated with a plurality of product parameters. The method also includes identifying an alternative product associated with at least one of the product parameters and at least one of the securities, and identifying a retailer that offers the alternative product for sale based on transaction data identifying prior purchase transactions involving the alternate product. In additional embodiments, the method includes generating a first electronic command to transmit information identifying the alternative product and the retailer for presentation on a device of the user.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims.

DESCRIPTION OF THE EMBODIMENTS

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, any section headings used herein are for organizational purposes only, and are not to be construed as limiting the subject matter described.

Figure 1:
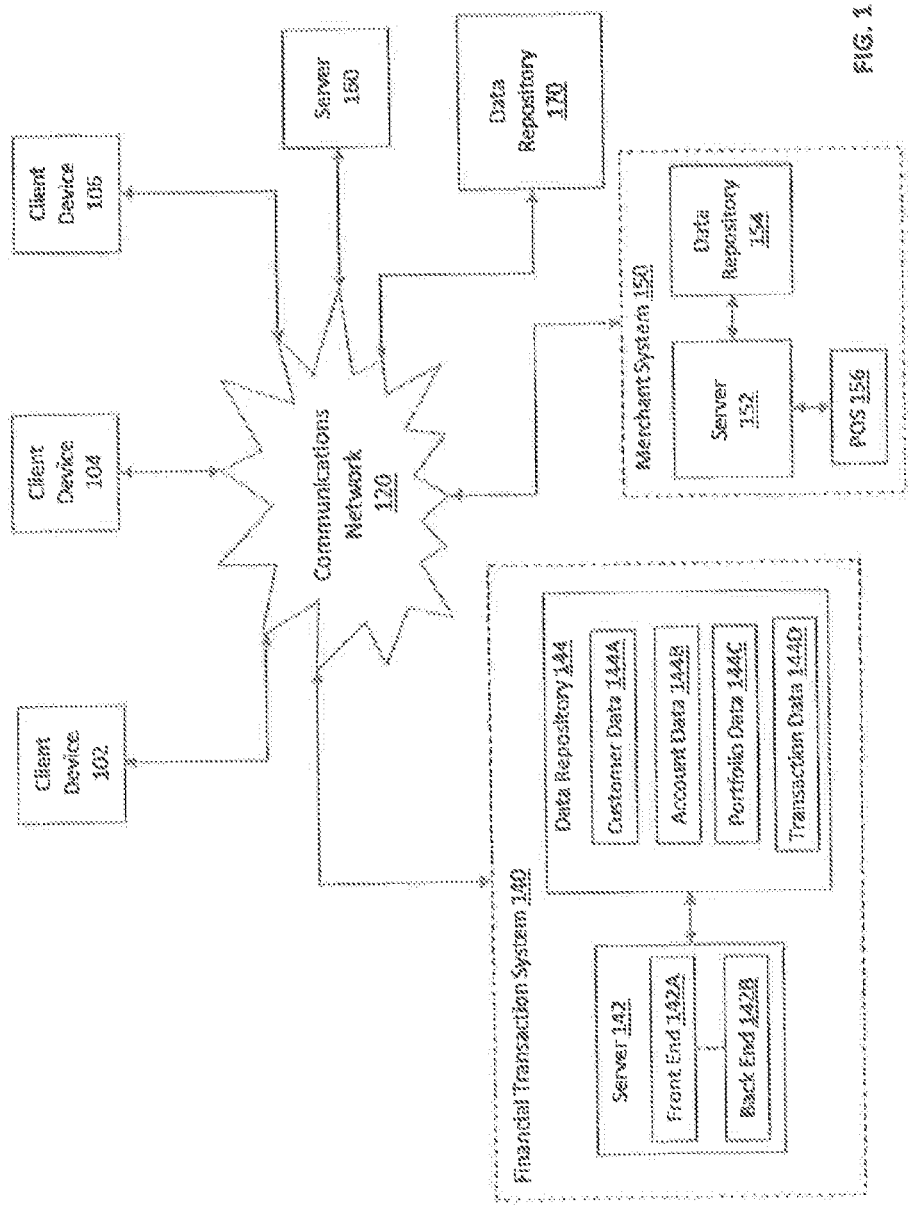
FIG. 1 is a diagram of an exemplary computing environment, consistent with disclosed embodiments.

FIG. 1 illustrates an exemplary computing environment 100, consistent with certain disclosed embodiments. In one aspect, system 100 may include a financial transaction system 140, a merchant system 150, a server 160, a data repository 170, and one or more client devices 102, 104, and 106 that may be interconnected via a communications network 120.

In one embodiment, financial transaction system 140 may be one or more computer systems associated with a financial institution, such as, for example, a commercial bank, an investment bank, a broker-dealer, a provider of a payment instrument and financial service accounts, etc. In some embodiments, a financial service account may be a check, savings, credit, debit, and/or a reward or loyalty account. In one embodiment, a payment instrument may include, but is not limited to, a personal or corporate credit card, a debit card, a prepaid credit or debit card, check instruments. These transactions include, but are not limited to, a transfer of funds between financial accounts (e.g., checking, savings, investment, etc.), a payment of a bill, a purchase or sale of a financial instrument or security, a deposit or withdrawal of funds, or an application for credit.

In certain embodiments, financial transaction system 140 may include a server 142 and a data repository 144. Server 142 may be, for example, a transaction server and may include a front end 142A, and a back end 142B disposed in communication with front end 142A, although the configuration of server 142 is not limited to such configurations. For exemplary purposes only, server 142 may be referred to as a transaction server 142. In one example, front end 142A and back end 142B of transaction server 142 may be incorporated into a single computer, a single server, or any additional or alternate computing device apparent to one or skill in the art. In other embodiments, front end 142A and backend 142B may be distributed computing devices. Further, in one embodiment, front end 142A may be one or more software programs, such as a software application (e.g., a web service) executing on transaction server 142. Similarly, backend 142B may be one or more software programs executing on server 142. However, transaction server 142 is not limited to such configurations, and, in additional embodiments, front end 142A can be executed on any computer or server separate from back end 142B.

Transaction server 142 may be configured to execute software instructions to perform one or more processes consistent with the disclosed embodiments. In one embodiment, and client devices 102, 104, and 106 may exchange information and parameters that facilitate an execution of one or more transactions by financial transaction system 140.

Data repository 144 may be one or more data storages configured to store information consistent with the disclosed embodiments. In one aspect, data repository may include user data 144A, account data 144B, portfolio data 144C, and transaction data 144C. In one aspect, user data 144A may include one or more data records that uniquely identify one or more users of a financial institution associated with transaction system 140. By way of example, a user of the financial institution may access a web page associated with transaction system 140 (e.g., through a web server executed by front end 142A), and may register for online banking services and provide data, which may be linked to the user and stored within user data 144A.

In certain aspects, user data 144A may include personal information associated with a user (e.g., a user name, a home address, a date of birth, government-issued identifiers (e.g., driver's license numbers and Social Security numbers), employment information (e.g., employer name and address), and contact information (e.g., email addresses, home numbers, work numbers, and mobile numbers). User data 144A may also include one or authentication credentials associated with registered users of the financial institution. For example, the authentication credentials may include, but are not limited to, a user name, a user-specified password, a system-generated password, or an alphanumeric identification number (e.g., a PIN number) specified by the user or assigned by financial transaction system 140. Other types of user information may be stored and used by the disclosed embodiments.

Additionally or alternatively, user data 144A may include information facilitating enhanced authentication techniques. For example, user data 144A may store information identifying a security question associated with the user (e.g., "What is your mother's maiden name?") and the user's registered answer to that security question. User data 144A may also include information identifying a particular security image or avatar selected by the user and displayed by the user during the authentication process.

Further, in one embodiment, user data 144A may include user device identification information that identifies one or more devices registered to the user. In one embodiment, the user may provide the user device identification information identifying (e.g., a mobile telephone number provided by the user when registering for online banking services), or alternatively, transaction server 142 may be configured to execute processes that automatically collect user device identification information (e.g., collecting an Internet Protocol (IP) address associated with the user's smartphone).

User data 144A may also include data that enables transaction server 142 to target content to one or more users (e.g., users of financial institution associated with financial transaction system 140), or alternatively, to identify a peer group of users (e.g., users) having interests similar to those of a particular user (e.g., customer). For example, such data may include, but is not limited to, demographic data associated with the group of users (e.g., age group, educational level, income level), social networking data (e.g., "handles" and links to one or more social networking sites), profile data indicating specific interests (e.g., health and fitness, renewable energy and "green" technologies, etc.), and any additional or alternate data that appropriate to the users and transaction server 142.

In certain aspects, account data 144B may include account identification information identifying one or more accounts of users of the financial institution associated with transaction system 140. In one embodiment, account identification information may include financial service account information, such as, for example, a checking account, a savings account, a revolving credit line, an account linked to a credit or debit card, a brokerage account, and any additional or alternate account provided or supported by the financial institution. In other embodiments, account data 144B may include account information associated with non-financial service accounts, such as membership accounts for certain services or activities (e.g., gym membership, prescription drug information, library card, employment identification, student account information, etc.)

In such embodiments, information within account data 144B may identify, for a single customer, one or more accounts associated with the user and account data corresponding to the accounts (e.g., account, expiration date information, and/or card security codes, account balance information, and/or credit limit information).

Further, in additional embodiments, the user may participate in loyalty and/or rewards programs provided by the financial institution, and additionally or alternatively, by one or more physical or electronic retailers (e.g., a retailer associated with merchant system 150). For example, the user may regularly stay in Marriott™ hotels during business travel, and the user may enroll in a rewards program sponsored by Marriott™ to obtain rewards points that the user may exchange for discounted hotel rates, upgrades, and other benefits. In some aspects, account data 144B may include identification information identifying the one or more loyalty or rewards programs in which the user participates, account information associated with the one or more rewards programs (e.g., account numbers, account holders, addresses, etc.), and further, information identifying the user's current balance of rewards or loyalty points.

Portfolio data 144C may include information identifying investment portfolios held by users of the financial institution. In one aspect, portfolio data 144C may include information identifying a real or "actual" investment portfolio composed of actual financial positions held by a user in various securities. In further aspects, portfolio data 144C may include information identifying one or more "virtual" investment portfolios composed of "simulated" positions held by the user in various securities. Portfolio data 144C may also include information identifying one or more "watch lists" that specify various securities monitored by the user.

In certain embodiments, the securities associated with the user's actual investment portfolio, virtual investment portfolio, and watch list may represent various equity and debt securities, including, but not limited to, shares of common stock, corporate or governmental bonds, mutual funds, bond funds, etc. Further, portfolio data 144C may include information identifying the simulated or actual positions held by the user in these securities, as well as information identifying a schedule for providing electronic updates to the user regarding a performance of these securities (e.g., daily, weekly, monthly, quarterly, or in response to customer-specific events).

In some aspects, portfolio data 144C may also include information identifying issuers of one or more of the equity and debt securities associated with the user's actual investment portfolio, virtual investment portfolio, or watch list. For example, portfolio data 144C may identify a corporate or other business entity that issues a common stock included within user 110's actual investment portfolio, virtual investment portfolio, and watch list, and further, a corporate, business, or other municipal entity that issues a debt security included within in user 110's actual investment portfolio, virtual investment portfolio, or watch list.

In other aspects, portfolio data 144C may include information identifying one or more investment programs in which user 110 participates. For example, portfolio data 144C may identify one or more dividend reinvestment plans (DRIPs) offered by issuers of common stock held within user 110's actual investment portfolio, virtual investment portfolio, or watch list. The disclosed embodiments are, however, to such exemplary issuers, investment programs, and offers, and in further embodiments, portfolio data 144C may include any additional or alternate information identifying securities, investment programs, and/or investment offerings held by user 110 and included within user 110's actual investment portfolio, virtual investment portfolio, or watch list.

Portfolio data 144C may also include information identifying an investment risk tolerance of the user. In one embodiment, the user's investment risk tolerance may represent a score ranging from one, which indicates a completely risk-averse user, to ten, which indicates a user willing to accept significant speculative risk within a corresponding actual or virtual investment portfolio. By way of the example, the investment risk tolerance score may be specified by the user, e.g., at an initial registration to access investment products associated with the financial institution, or alternatively, may be determined by transaction server 142 from an outcome of an interactive financial investment game, as outlined below.

Further, portfolio data 144C may include information identifying one or more investment goals of the user. Investment goals consistent with the disclosed embodiments include, but are not limited to, a specified cash reserve associated with an actual or virtual investment portfolio, a maximum value of all securities and cash within an actual or virtual investment portfolio, and a ratio of debt instruments (e.g., bonds) to equity instruments (e.g., common stock) within an actual or virtual investment portfolio.

In certain embodiments, financial transaction system 140 may be configured to execute software processes that provide an online banking portal enabling the user to generate and administer an virtual investment portfolio or watch list that includes one or more securities of interest (e.g., identified based on the user's prior transactions, specified interests, or securities held by a corresponding "investment" group). Financial transaction system 140 may, in such embodiments, be configured to store information identifying the generated virtual investment portfolio and/or watch list within portfolio data 144C. In certain aspects, the information obtained through the user's interaction with the virtual portfolio or the watch list may provide the user with sufficient confidence generate and administer an actual investment portfolio composed of actual positions in the securities of interest.

In further embodiments, the online banking portal allows the user to "rebalance" a virtual or actual investment portfolio by increasing or decreasing a position in one or more securities (e.g., an equity position in an equity security and a creditor position in a debt security). For instance, the rebalancing of the virtual or actual investment portfolio may occur at periodic intervals, in response to certain events within the marketplace (e.g., in response to market fluctuations of predetermined magnitude), or alternatively, in response to one or more transactions to purchase goods or services. Further, in some embodiments, a financial advisor or third party associated with the financial institution may advise the user regarding the rebalancing of the actual or virtual portfolio.

Transaction data 144D may include information identifying one or more transactions that involve one or more users of the financial institution associated with financial transaction system 140, and additionally or alternatively, one or more accounts of the one or more users of the financial institution. In one embodiment, such transactions may include, but are not limited to, purchase transaction (e.g., purchases of goods and/or services from electronic or physical retailers), financial service transactions (e.g., fund transfers (e.g., between accounts), bill payment transactions (e.g., electronic bill payment transactions), financial instrument or security purchase or sale, a deposit or withdrawal of funds, or an application for credit from the financial institution or other entity.

For example, as described herein, financial transaction system 140 may execute software processes that provide an online financial service portal enabling a user to access a web page of the financial institution to perform financial service type transactions. For instance, financial transaction system 140 may provide an online banking portal that enables a user to transfer funds between a first user account to a second account, to schedule automatic bill payment services (e.g., select an amount and periodic payment date for making payments to an identified payee from the user's selected financial account), and other known types of online financial service processes. For instance, financial transaction server 142 may generate a data record within transaction data 144D that corresponds to the particular service initiated by the customer, such as an initiated transfer of funds, and may the populate the data record with information associated with the initiated transaction. As an example, transaction information for a funds transfer may include, but is not limited to, an unique identifier associated with the fund transfer transaction, a timestamp of the transaction, and transaction parameter information (e.g., a source account, a target account, a transaction date, and an amount of transfer).

In some embodiments, transaction data 144D may include information identifying a purchased good or service, which may include one or more product identifiers (e.g., a name of the good or service, a stock-keeping unit (SKU) number, a universal product code (UPC), a quick response (QR) code, and/or a photographic or visual representations of the good or service). Additionally or alternatively, the information identifying the purchase good or service data may include: a brand name associated with the good or service; one or more categories associated with the good or service; a product line or product family associated with the good or service; information identifying related or competitor goods and services; physical characteristics of the purchased goods (e.g., a functionality, a size, a shape, a weight, and a color); and information associated with the retailer (e.g., a name of the retailer or a geographic location of the retailer). Further, as described below, the various elements of obtained data may be linked through a hierarchical relationship.

Merchant system 150 may be one or more computer systems associated with a business entity that provides products and/or services. In one example, merchant system 150 may be associated with a retailer having one or more physical retail locations disposed within a geographic area (i.e., a "physical retailer"). Merchant system 150 may be a retailer that provides electronic or e-commerce type retail services. In one example, merchant system 150 may be an electronic or an e-commerce retailer that interacts with consumers through corresponding web interfaces or retailer-specific application programs (e.g., mobile "apps"). In one embodiment, one or more client devices 102, 104, and 106 can exchange information with merchant system 150 to purchase one or more goods and/or services using various payment instruments, and merchant system 150 exchanges information with financial transaction system 140 to obtain authorization for such purchase instruments, e.g., using a point-of-sale module described below.

Merchant system 150 may include, in one example, a merchant server 152, a data repository 154, and point-of-sale (POS) module 156. Although not depicted in FIG. 1, merchant server 152 may include a front end and a back end disposed in communication with the front end. In an embodiment, the front and back ends may be incorporated into a hardware unit, for example, a single computer, a single server, or any additional or alternate computing device apparent to one or skill in the art. In other embodiments, the front end may be a software application, such as a web service, executing on merchant server 152. However, merchant server 152 is not limited to such configurations, and, in additional embodiments, the front end may be executed on any computer or server separate from the back end.

Data repository 154 may be one or more storage devices that store information consistent with the disclosed embodiments. In one aspect, data repository 154 may store user data that uniquely identifies and profiles one or more users of the merchant associated with merchant system 150, and transaction data identifying one or more purchase transactions involving one or more users of the merchant. Further, in such embodiments, data repository 164 also includes elements of electronic content that may be delivered to users of the merchant, including but not limited to, images and corresponding text describing goods and services sold by the merchant, one or more advertisements that could be delivered to the users, or one or more rewards that could be provided to the customer.

In one embodiment, POS 156 may be one or more point of sale devices configured to perform known point of sale processes. A POS 156 may be disposed at a physical location in a merchant location associated with merchant system 150, such as a location where a user may provide payment for goods and/or services (e.g., at a cash register at the merchant). The disclosed embodiments are not limited to such physical POS modules, and in additional embodiments, POS module 156 may be a software module executed by merchant server 152.

Client devices 102, 104, and 106 may each reflect a computing device associated with a user (e.g., a user of the merchant and/or the financial institution disclosed above). In certain aspects, client devices 102, 104, and 106 can include, but are not limited to, a personal computer, a laptop computer, a tablet computer, a notebook computer, a hand-held computer, a personal digital assistant, a portable navigation device, a mobile phone, a smart phone, a set top box, a third party portals, an optical disk player (e.g., a DVD player), a digital video recorder (DVR), and any additional or alternate computing device operable to transmit and receive data across network 120.

Further, although computing environment 100 is illustrated in FIG. 1 with three client devices 102, 104, and 106 in communication with transaction system 140, persons of ordinary skill in the art will recognize that environment 100 may include any number of number of mobile or stationary client devices, and any additional number of computers, systems, or servers without departing from the spirit or scope of the disclosed embodiments. Further, although computing environment 100 is illustrated in FIG. 1 with a single merchant system 150, a single transaction system 140, a single server 160, and a single external data repository 170, persons of ordinary skill in the art will recognize that environment 100 may include any number of additional number of merchant and financial systems, any number of additional number of servers and data repositories, and any additional number of computers, systems, servers, or server farms without departing from the spirit or scope of the disclosed embodiments.

Communications network 120 may represent any form or medium of digital data communication. Examples of communication network 120 include a local area network ("LAN"), a wireless LAN, a RF network, a Near Field Communication network, e.g., a "WiFi" network, a wireless Metropolitan Area Network (MAN) that connects multiple wireless LANs, and a wide area network ("WAN"), e.g., the Internet. Consistent with embodiments of the present disclosure, network 120 can include the Internet and include any publicly accessible network or networks interconnected via one or more communication protocols, including, but not limited to, hypertext transfer protocol (HTTP) and transmission control protocol/internet protocol (TCP/IP). Moreover, communications network 120 may also include one or more mobile device networks, such as a GSM network or a PCS network, that allow client devices, such as client device 102, to send and receive data via applicable communications protocols, including those described above.

In one embodiment, one or more of transaction server 142 and merchant server 152 may include a general purpose computer (e.g., a personal computer, network computer, server, or mainframe computer) having one or more processors that may be selectively activated or reconfigured by a computer program. In additional embodiments, one or more of transaction server 142 and merchant server 152 may be incorporated as corresponding nodes in a distributed network, and additionally or alternatively, as corresponding networked servers in a cloud-computing environment. Furthermore, transaction server 142 and merchant server 152 may communicate via network 120 with one or more additional servers (not shown), which facilitate the distribution of processes for parallel execution by the additional servers. In certain aspects, transaction server 142 and/or merchant server 152 may execute software instructions that perform one or more processes consistent with the disclosed embodiments.

Server 160 may be a computing device that provides information to one or more other components of computing environment 100. In one embodiment, server 160 may include a general-purpose computer (e.g., a personal computer, network computer, server, or mainframe computer) having one or more processors that may be selectively activated or reconfigured by a computer program. In one aspect, server 160 may be configured to provide one or more websites associated with an advertiser and/or content provider network. Further, upon request from a client device (e.g., client device 102), server 160 may be configured to provide information associated with a requested web page over communications network 120 to client device 102, which may render the received information and present the web page to a customer. Additionally, server 160 may be incorporated as a corresponding node in a distributed network, and additionally or alternatively, as a corresponding networked server in a cloud-computing environment. Furthermore, server 160 may communicate via network 120 with one or more additional servers (not shown), which may facilitate the distribution of processes for parallel execution by the additional servers.

Data repository 170 may be one or more storages that store information provided by or used by one or more components of computing environment 100. In one aspect, data repository may be incorporated into a single hardware unit, for example, a single computer or a single server. In such an embodiment, data repository 170 may be include one or more storage mediums or storage devices. However, data repository 170 is not limited to such configurations, and, in additional embodiments, data repository 170 may reside on any additional or alternate computer or server accessible to transaction server 142, merchant server 152, and client devices 102, 104, and 106 over network 120.

Figure 2:
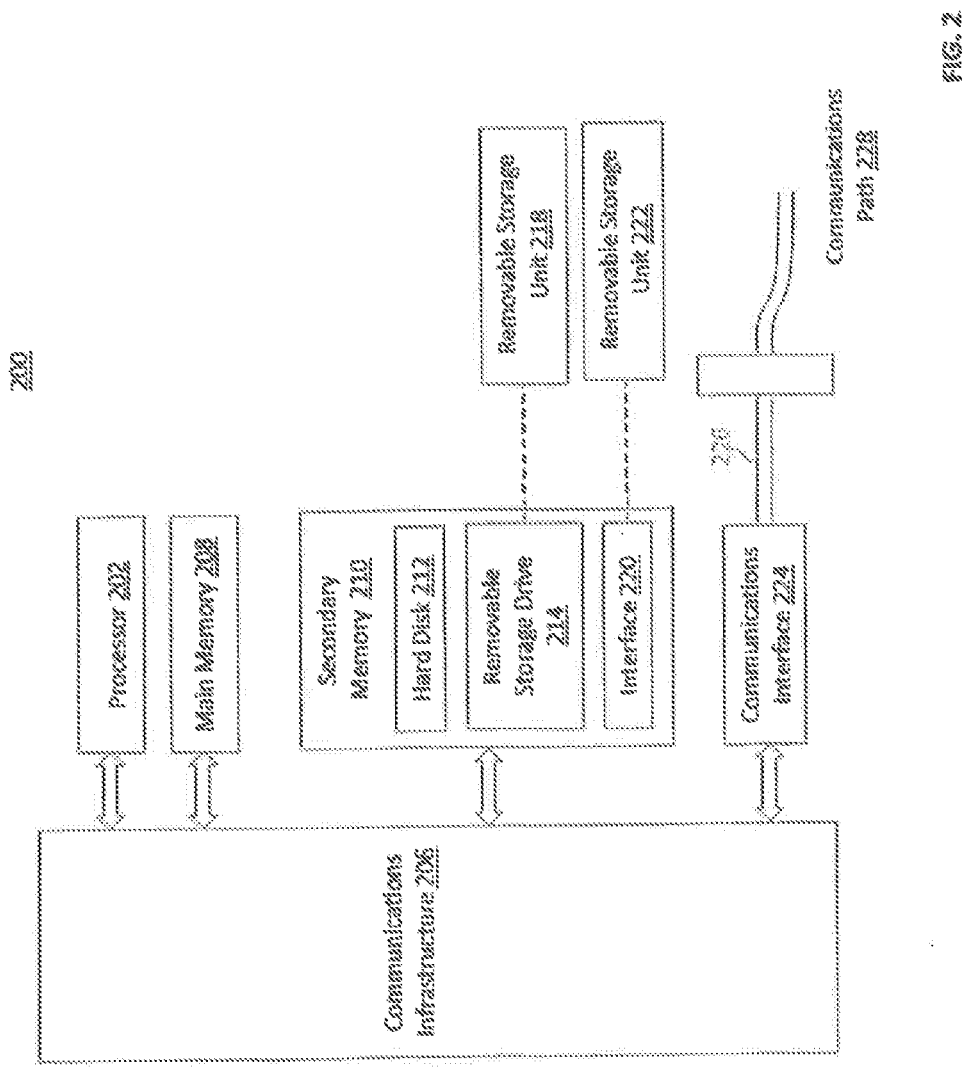
FIG. 2 is a diagram of an exemplary computer system consistent with disclosed embodiments.

FIG. 2 is an exemplary computer system 200 with which embodiments consistent with the present disclosure may be implemented. In one aspect, computer system 200 may reflect the computer systems associated with server 142, server 152, server 160, client devices 102, 104, and/or 106. In certain embodiments, computer system 200 may include one or more processors, such as processor 202. Processor 202 may be connected to a communication infrastructure 206, such as a bus or communications network, e.g., network 120 of FIG. 1.

Computer system 200 may also include a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 may represent a magnetic tape, optical disk, or other storage medium that is read by and written to by removable storage drive 214. As will be appreciated, the removable storage unit 218 can represent a computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, etc. Software and data may be transferred via communications interface 224 in the form of signals 226, which may be electronic, electromagnetic, optical or other signals capable of being received by communications interface 224. These signals 226 are provided to communications interface 224 via a communications path (i.e., channel 228). Channel 228 carries signals 226 and may be implemented using wire, cable, fiber optics, RF link, and/or other communications channels. In a disclosed embodiment, signals 226 comprise data packets sent to processor 202. Information representing processed packets can also be sent in the form of signals 226 from processor 202 through communications path 228.

In certain embodiments in connection with FIG. 2, the terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer system 200. Such computer programs and sets of instructions can be stored within one or more computer-readable media. Additionally or alternatively, computer programs and sets of instructions may also be received via communications interface 224 and stored on the one or more computer-readable media.

Such computer programs and instructions, when executed by processor 202, enable processor 202 to perform one or more processes consistent with the disclosed embodiments. Examples of program instructions include, for example, machine code, such as code produced by a compiler, and files containing a high-level code that can be executed by processor 202 using an interpreter.

Furthermore, the computer-implemented methods described herein can be implemented on a single processor of a computer system, such as processor 202 of system 200. However, in additional embodiments, these computer-implemented methods may be implemented using one or more processors within a single computer system, and additionally or alternatively, these computer-implemented methods may be implemented on one or more processors within separate computer systems linked via a network.

The disclosed embodiments include systems and methods that provide, to a user, recommendations of "alternative" products consistent with a "virtual" and/or "actual" investment portfolio of the user. For example, as described below in reference to FIG. 3, a user at a client device (e.g., one of client devices 102, 104, and 106 of FIG. 1) may access an digital portal associated with a system of a financial institution (e.g., financial transaction system 140 of FIG. 1). Using the digital portal, the user may receive information identifying one or more alternative products that are associated with one or more product parameters that may be similar to a previously purchased product and further, that may be consistent with securities held within the user's actual or virtual investment portfolio. For example, the one or more alternative products may be similar in type, class, or sector to a previously purchased product, and may be consistent with securities held within the user's actual or virtual investment portfolio. In some embodiments, the user's interaction with the alternative products may highlight a connection between the user's everyday purchases (and additionally or alternatively, the user's friends and family) and the user's investment portfolio, and may foster increased engagement between the user and the various investment opportunities at his or her disposal.

Figure 3:
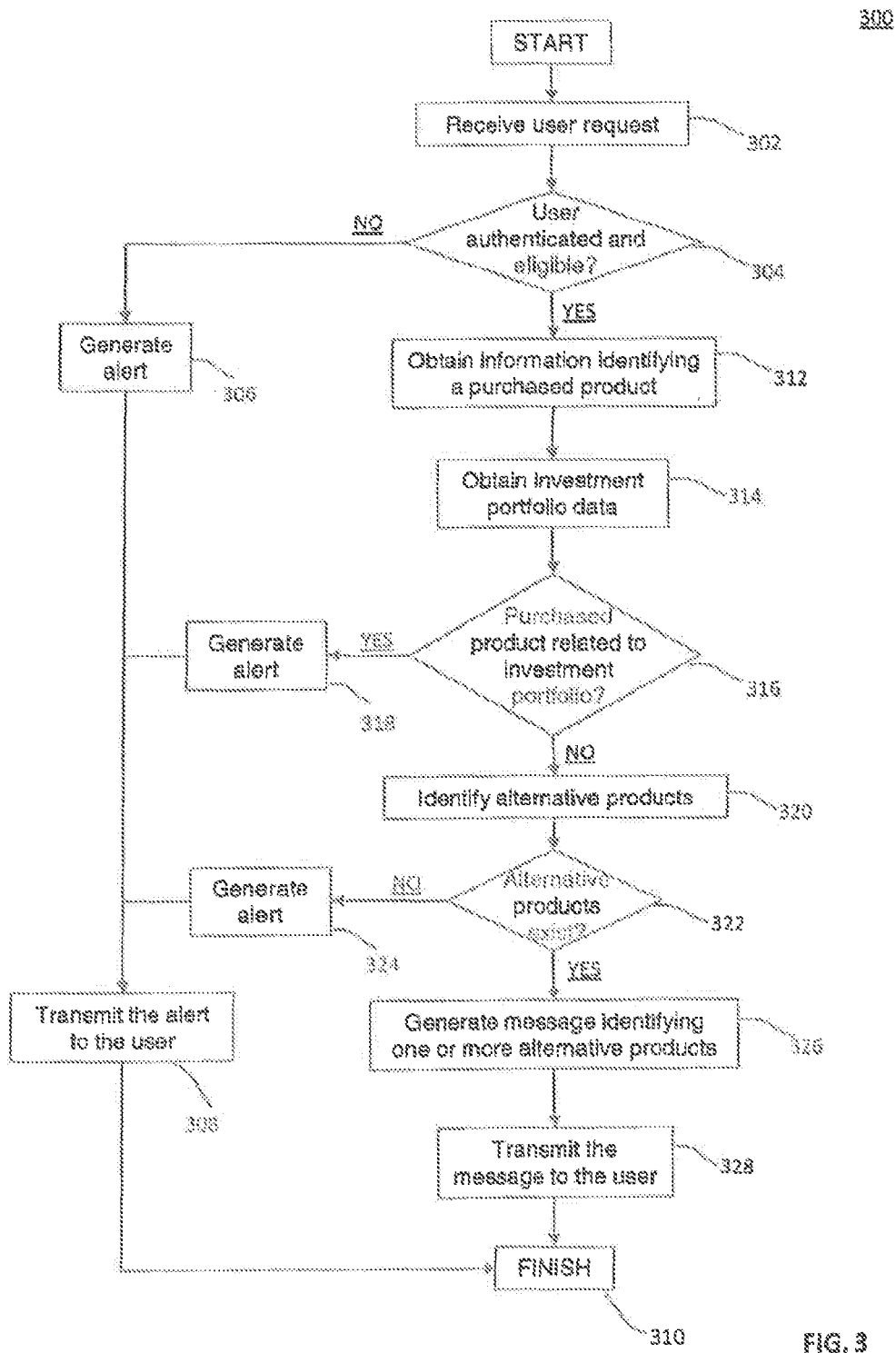
FIG. 3 is a flowchart of an exemplary method for identifying alternative products based on investment portfolio data, consistent with disclosed embodiments.

FIG. 3 illustrates an exemplary method 300 for identifying alternative products based on investment portfolio data, in accordance with disclosed embodiments. In one embodiment, a server (or other computing device or system), which may be associated with a financial institution (e.g., transaction server 142 of FIG. 1), may be configured to obtain information identifying a product previously purchased by a user. In one example, transaction server 142 may be further configured to identify an alternative product related to an investment portfolio of the user, and to transmit information identifying the alternative product to a client device of the user. In certain embodiments, the alternative product and the purchased product may be associated with a common product parameter (e.g., product type, class, and/or sector). In another aspect, the alternative product may be associated with an issuer of one or more securities held within the user's investment portfolio.

In FIG. 3, in step 302, transaction server 142 receives a request for alternative product recommendations from a user at a client device (e.g., client device 102 of FIG. 1). In one embodiment, the user may operate client device 102 to access a web page associated with the financial institution, and may enter one or more authentication credentials (e.g., a user name, a password, an account number, and a personal identification number) into the accessed web page. Client device 102 may generate a request that includes the entered authentication credentials, which client device 102 may transmit to transaction server 142 using one or more of the communications protocols outlined above.

Upon receipt of the request in step 302, transaction server 142 may execute software instructions to authenticate the user in step 304. For example, transaction server 142 may obtain the authentication credentials from the request, access data associated with the user (e.g., within customer data 144A of FIG. 1), and authenticate the user based on a comparison of the transmitted credentials and the obtained user data. Additionally or alternatively, transaction server may identify a source of the received request (e.g., a mobile telephone number or Internet Protocol (IP) address associated with client device 102), and may determine whether the identified source corresponds to a registered device of the customer. The disclosed embodiments are, however, not limited to such exemplary authentication techniques, and in additional embodiments, transaction server 142 may authenticate the user through any additional or alternate technique appropriate to the customer, client device 102, and the financial institution.

In certain embodiments, transaction server 142 may also determine in step 304 whether the users eligible to receive alternative product recommendations (e.g., whether the user opted-in to receive such recommendations). For example, transaction server 142 may be configured to parse the accessed user data to determine whether the user "opted-in" to receive the alternative product recommendations, or alternatively, whether the user's status at the financial institution renders the user ineligible to receive the alternative product recommendations.

If transaction server 142 fails to authenticate the user or determines the user is ineligible (step 304; No), transaction server 142 generates an alert notifying the user of the failed authentication in step 306. In step 308, transaction server 142 may execute software processes to transmit the alert to client device 102 over network 120 using one or more of the communications protocols outlined above. Method 300 is then complete in step 310.

If, however, transaction server authenticates the user and determines the user is eligible to receive alternative product recommendations (step 304; Yes), transaction server 142 may obtain transaction data associated with the user in step 312. For example, as described herein, the transaction data obtained in step 312 may identify one or more transactions between the user and corresponding physical or electronic retailers (e.g., merchant system 160 of FIG. 1). In some embodiments, transaction server 142 may obtain the transaction data from a data repository (e.g., transaction data 144D of data repository 144 and/or external data repository 170 of FIG. 1).

In certain embodiments, the obtained transaction data includes information identifying one or more products purchased by the user (e.g., purchased goods or services). For example, the information may include, but is not limited to, one or more product identifiers (e.g., a name of the product, a stock-keeping unit (SKU) number, a universal product code (UPC), a quick response (QR) code, and a photographic or visual representations of the product), a brand name associated with the product, one or more product categories, a product line or product family, information identifying related or competitor product, physical characteristics of the purchased product (e.g., a functionality, a size, a shape, a weight, and a color), and information associated with the retailer (e.g., a name of the retailer or a geographic location of the retailer).

Further, in an embodiment, the disclosed embodiments may execute software instructions to determine a hierarchical relationship that may exist between elements of the information identifying the purchased product within the transaction data obtained in step 312. For example, the user may have purchased a pint of Häagen-Dazs™ ice cream for $4.99 from a Safeway™ grocery store in Washington, D.C., on Aug. 19, 2013. In such an instance, the disclosed embodiments may obtain transaction data that includes a SKU number associated with the Häagen-Dazs™ ice cream. In certain aspects, the obtained transaction data may also include information identifying a manufacturer of the purchased product (e.g., Häagen-Dazs™), a business entity that provides the purchased product (e.g., General Mills™), the retailer (i.e., Safeway™), a location of purchase (i.e., Washington, D.C.), a date of purchase (i.e., Aug. 19, 2013), and/or an amount associated with the transaction (e.g., $4.99). Further, the SKU number may be linked to not only a brand identifier (i.e., Häagen-Dazs™) and the retailer (i.e., Safeway™), but also to one or more product parameters, such as a product type (e.g., ice cream), a product class (e.g., premium frozen desserts), and a product sector (e.g., dairy products).

Referring back to FIG. 3, in step 314, transaction server 142 may obtain data corresponding to one or more actual and/or virtual investment portfolios associated with the user. For example, in step 314, transaction server 142 may access information identifying the actual and virtual investment portfolios held by the user (e.g., stored within portfolio data 144C of FIG. 1), and identify positions in one or more securities held in the user's actual and/or virtual investment portfolios. As described herein, the user's actual investment portfolio may be composed of actual financial positions held by the user in various securities, and the user's virtual investment portfolio may be composed of "simulated" financial positions held by the customer in various securities. In certain aspects, the securities held within the user's actual and/or virtual investment portfolios includes shares of common stock, corporate or governmental bonds, mutual funds, bond funds, exchange-traded funds (ETFs), various currencies, and other financial instruments.

For example, in step 314, transaction server 142 may access and analyze information stored in one or more data storages that enable it to determine that the user's actual investment portfolio includes corporate bonds and common stock issued by Unilever™, which provides different types of products, such as Ben & Jerry's™ premium ice cream, Good Humor™ ice cream, Dove™ soap, and Axe™ body spray. Transaction server 142 may also determine in step 314 that the user's actual investment portfolio includes common stock issued by Proctor & Gamble™, which provides products such as Olay™ moisturizer and Gillette™ razors.

In step 316, transaction server 142 may determine whether the purchased product is related to one or more of the securities held within the user's actual and/or virtual investment portfolios. For example, transaction server 142 may execute software processes to identify a business entity (e.g., a manufacturer or a corporate parent) that provides the purchased product based on the obtained transaction data. In certain embodiments, in step 316, transaction server 142 may determine an existence of a relationship between the purchased product and the user's actual or virtual investment portfolio based on a presence of securities issued by the business entity within the user's actual or virtual investment portfolio.

If transaction server 142 determines that the purchased product is related to the user's actual and/or virtual investment portfolio (e.g., step 316; Yes), transaction server 142 may generate a message (e.g., an alert or other type of indication) in step 318 that identifies the relationship between the purchased product and the user's actual or virtual investment portfolio. As described herein, transaction server 142 may transmit the generated alert to client device 102 in step 308 over network 120 using one or more of the communications protocols outlined above, and method 300 is then complete in step 310. In certain aspects, the transmitted alert may highlight, to the user, a connection between the user's everyday purchases and the investment portfolios held by the user, and may foster increased engagement between the user and the user's investment portfolios.

If, however, transaction server determines that a relationship does not exist (e.g., step 316; No), transaction server 142 may identify one or more alternative products in step 320. In certain aspects, the one or more "alternative" products may be similar to the purchased product (e.g., sharing one or more of a common product type, class, or sector) and are related to one or more securities within the user's actual and/or virtual investment portfolio.

For example, in step 320, transaction server 142 may perform processes that identify one or more business entities that issue the securities held within the user's actual and/or virtual investment portfolios, and further, any additional business entities having relationships with the issuers (e.g., wholly-owned subsidiaries, partners, members of joint ventures, suppliers, members of a common supply chain, etc.). Further, in step 320, transaction server 142 may access and analyze information stored in one or more data storages to identify one or more candidate products provided by the issuers and/or the related business entities. In certain aspects, the candidate products may be manufactured by the issuers or the related business entities, sold by the issuers or the related business entities, transported by the issuers or the related business entities, or distributed by the issuers or the related business entities.

In some embodiments, transaction server 142 may identify the issuers and the related entities based on the obtained portfolio data, additional data available from the financial institution (e.g., within portfolio data 144C of FIG. 1), and additionally or alternatively, information obtained from a server (e.g., server 160 of FIG. 1) or a data repository (e.g., data repository 170 of FIG. 1) accessible to transaction server 142 over network 120. By way of example, server 160 and/or data repository 170 may be associated with a financial reporting service, a corporate research firm, or a branch of a state government that registers corporations.

Further, in step 320, transaction server 142 may execute software instructions that identify relationships between the purchased product and the one or more candidate products based product type information (e.g., ice cream), product class information (e.g., premium frozen desserts), and product sector information (e.g., dairy products). In an embodiment, in step 320, transaction server 142 may select, as the alternative products, one or more of the candidate products having corresponding relationships with the purchased product.

For example, as described herein, the user may have purchased a pint of Häagen-Dazs™ ice cream for $4.99 from a Safeway™ grocery store in Washington, D.C., on Aug. 19, 2013. In certain embodiments, transaction server 142 may execute software instructions to determine that General Mills™ is a business entity providing Häagen-Dazs™ ice cream, and further, that the user's actual investment portfolio fails to include securities issued by General Mills™. Thus, transaction server 142 may determine in step 316 that the purchased product is not related to the user's actual investment portfolio, and in step 320, transaction server 142 may identify alternatives to the purchased Häagen-Dazs™ that might be related to the user's actual investment portfolio.

In some aspects, transaction server 142 may determine in step 320 that the user's actual investment portfolio includes securities issued by Unilever™, which provides Ben & Jerry's™ ice cream, Good Humor™ ice cream, Dove™ soap, and Axe™ body spray, and securities issued by Proctor & Gamble™, which provides products such as Olay™ moisturizer and Gillette™ razors. Transaction server 142 may also determine that the purchased Häagen-Dazs™ is related to the Ben & Jerry's™ ice cream the Good Humor™ ice cream provided by Unilever™. In such embodiments, transaction server 142 may identify Ben & Jerry's™ ice cream and Good Humor™ ice cream as "alternatives" to the purchased Häagen-Dazs™, based on the similarity in product type (e.g., ice cream) and the relationship between Ben & Jerry's™ ice cream and an issuer of securities within the user's actual investment portfolio (e.g., Unilever™).

In certain aspects, transaction server 142's identification of alternate products may be influenced by location-based data related to the user, the user's prior purchases, and/or prior purchases by the user's friends and family. For example, transaction server 142 may be configured to process transaction data and determine that the user regularly purchases goods and services from physical retailers disposed within a particular geographic region (e.g., Washington, D.C.). Transaction server 142 may also be configured to determine, based on the obtained transaction data, that the user regularly ships goods purchased from electronic retailers to an address located in Washington, D.C.

Based on the determined regular purchases from physical retailers in Washington, D.C., and further, the regular shipments of goods purchased from electronic retailers to an address in Washington, D.C., transaction server 142 may determine that Washington, D.C., represents a geographic region of interest to the user. By way of example, transaction server 142 may determine that Washington, D.C. corresponds to a geographic region of interest when the user initiates greater than a threshold number of purchase transactions involving physical retailers within Washington, D.C., within a predetermined time period, when the user ships greater than a threshold number of online purchases (e.g., from electronic retailers) to a Washington, D.C., address within the predetermined time period, and/or combinations thereof. In other instances, transaction server 142 may access profile data associated with the user (e.g., as stored within customer data 144A of FIG. 1), determine a home or other address specified by the user, and establish the geographic region of interested based on the specified address.

In some embodiments, transaction server 142 may identify in step 320 issuers of securities held within the user's actual investment portfolio (and further related business entities) that not only provide alternate products having relationships with the purchased product, but that are also relevant to the user's geographic region of interest. Further, in some instances, when transaction server 142 identifies multiple potential alternate products provided by issuers of securities, transaction server 142 may select at least one of the potential alternate products for presentation to the user based on a relationship between the at least one potential alternate product and the user's geographic region of interest. For instance, transaction server 142 may select Good Humor™ ice cream as an alternative to the purchased Häagen-Dazs™ ice cream based on the U.S. patents obtained for the Good Humor™ ice cream product in the 1920's and the status of the Washington, D.C., area as an early franchise market.

The disclosed embodiments may also be configured to identify at least one of the alternate products based on based on the user's membership or participation in loyalty and/or rewards programs. For instance, in step 320, transaction server 142 may access information identifying one or more loyalty or rewards programs associated with the user (e.g., as stored within account data 144B of FIG. 1), and may process the obtained loyalty or rewards program information to identify corporate entities associated with the loyalty and/or rewards programs. In some aspects, transaction server 142 may, in step 314, identify securities issued by the corporate entities that are held within the user's actual investment portfolio, and further, that provide alternative products that are related to the purchased product.

In other aspects, transaction server 142 may be configured to identify at least one of the alternate products based on information specified by the user within user profile data (e.g., as stored within customer data 144A of FIG. 1). By way of example, the user may specify an interest in health and fitness within the profile data, and transaction server 142 may identify in step 320 one or more alternate products that are consistent with the user's interest in health and fitness, and additionally or alternatively, that are provided by issuers of held securities that provide goods and services related to health and fitness. For instance, transaction server 142 may identify Ben & Jerry's™ frozen yogurt as an alternative to the purchased Häagen-Dazs™ ice cream based on the similarity in product type (e.g., frozen desserts), the relationship between Ben & Jerry's™ frozen yogurt and an issuer of securities within the user's actual investment portfolio (e.g., Unilever™), and the user's expressed interest in health and fitness.

Additionally, in some instances, transaction server 142 may select alternative products for presentation to the user (e.g., in step 320) based on a history of the user's purchases of previously recommended alternate products. By way of example, transaction server 142 may repeatedly identify Good Humor™ ice cream as an alternative to the purchased Häagen-Dazs™ ice cream, but based on an analysis of user 110's transaction data (e.g., stored within transaction data 144D), transaction server 142 may determine that the user has never purchased the recommended Good Humor™ ice cream. In some aspects, transaction server 142 may be configured to eliminate Good Humor™ ice cream as a potential alternate product in future recommendations despite the presence of securities issued by Unilever™ in the user's investment portfolio.

Referring back to FIG. 3, transaction server 142 may determine in step 328 whether any alternatives to the purchased product were identified, e.g., in step 320. If transaction server 142 was unable to identify any alternatives to the purchased product (e.g., step 322; No), transaction server 142 may generate an alert to the user indicating the failure to identify alternative products in step 324. As described herein, transaction server 142 may transmit the generated alert to client device 102 in step 308 over network 120 using one or more of the communications protocols outlined above, and method 300 is then complete in step 310.

If, however, transaction server 142 identified alternatives to the purchased product (e.g., step 322; Yes), transaction server 142 may execute software instructions to generate a message identifying one or more of the identified alternate products to the user in step 326. In one embodiment, the generated message may identify each of the alternative products, and additionally or alternatively, information highlighting the relationship between the alternative products and the user's actual or virtual investment portfolio.

In other embodiments, transaction server 142 may select one or more of the alternative products for inclusion within the message. For example, transaction server 142 may select one or more of the alternative products for inclusion within the message based on a numerical ranking indicating a degree of "similarity" between the purchased product and corresponding ones of the alternative products. In such embodiments, transaction server 142 may execute software instructions to assign rankings to the alternative products based on a correspondence between product parameters of the purchased and alternative products (e.g., product type, product class, product sector, etc.). For example, transaction server 142 may assign a higher ranking to an alternative product sharing a common product type with the purchased product than to an alternative product sharing a common product class or common product sector with the purchased product.

Referring back to FIG. 3, in step 328, transaction server 142 may transmit the generated message to client device 102 across network 120 using any of the communications protocols described herein. Exemplary method 300 then passes back to step 310, and exemplary method 300 is complete.

In some embodiments, transaction server 142 may generate a message in step 326 that includes information identifying the purchased product and the one or more alternative products. In one embodiment, transaction server 142 may generate a message that includes textual information identifying the purchased product and the one or more alternative products, as well as graphical representations that visually identify the purchased product and the one or more alternative products to the user. For example, the graphical representations may include digital images of the packaging of the purchased and alternate products (e.g., an image of a carton of Ben & Jerry's™ ice cream and a carton of Häagen-Dazs™ ice cream), and additionally or alternatively, images of logos or mascots associated with business entities that provide the purchased and alternative products.

Further, in additional embodiments, the generated message may identify one or more options for purchasing one or more of the alternative products from corresponding physical or electronic retailers (e.g., retailers associated with merchant system 150 in FIG. 1). For example, the identified retailers may have a relationship with the financial institution associated with transaction server 142, and the generated message may provide additional information identifying a discount or other benefit available to the user if the user purchases one or more of the recommended products with a payment instrument associated with the financial institution.

Figure 4:
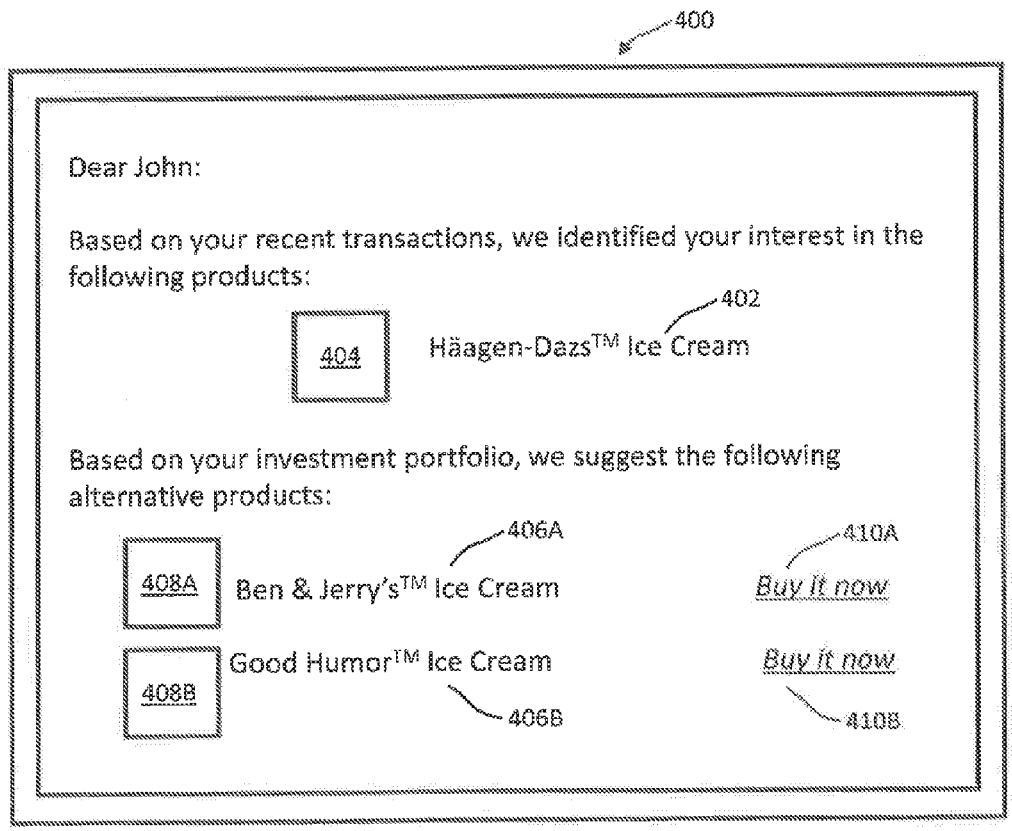
FIG. 4 is a diagram of an exemplary customer message, consistent with disclosed embodiments.

FIG. 4 illustrates an exemplary recommendation message 400, in accordance with disclosed embodiments. In an embodiment, a client device associated with the customer (e.g., client device 102 of FIG. 1) may receive information associated with message 400 from a transaction server associated with a financial institution (e.g., transaction server 142 of FIG. 1). Client device 102 may execute software processes that render the received message for display on an interface of a display of client device 102. For example, message 400 may be displayed within a portion of a web page associated with the financial institution (e.g., as accessed by the customer using a link delivered to the customer in an email message, text message, or instant message), or alternatively, message 400 may be displayed within a graphical user interface (GUI) of an application associated with the financial institution and executed by client device 102 (e.g., mobile banking application executed on a smartphone).

In FIG. 4, message 400 includes information 402 identifying a product recently purchased by the user (e.g. Häagen-Dazs™ ice cream), and an image 404 that identifies the purchased Häagen-Dazs™ ice cream to the user. As described herein, and based on this purchase and the user's holding of stock in the Unilever™, transaction server 142 may recommend the user purchase Ben & Jerry's™ ice cream and Good Humor™ ice cream bars as alternative products. As illustrated in FIG. 4, message 400 may also include information 406A and 406B identifying the alternative products, and an images 408A and 408B that identify the alternative products to the user.

Message 400 may also include links 410A and 410B to one or more physical retailers or electronic retailers that offer corresponding ones of the alternative products sale. For example, the user may select link 410A (e.g., by clicking with a mouse, touching or tapping a finger or styles over a corresponding display screen, or through an entry of appropriate keystrokes), and client device 102 may execute software instructions that display a web page associated with a retailer that offers the Ben & Jerry's™ ice cream for sale.

In some embodiments, the user may purchase one or more of the alternative products from a corresponding electronic or physical retailer using a payment instrument (e.g., a credit card or a debit card) issued by a financial institution associated with transaction server 142. In one aspect, the retailer may have a business relationship with the financial institution, and may provide customers of that financial institution with a discount (e.g., a discount of 10% on full-price items) or an amenity (e.g., free standard shipping or delivery) if these customers purchase an item using a payment instrument issued by the financial institution. In such an embodiment, not depicted in FIG. 4, message 400 may include information identifying the relationship between a retailer and the financial institution, and further, information identifying the discount or amenity provided to the user if the user purchases the recommended product using an approved payment instrument (e.g., a credit card or debit card issued by the financial institution).

Further, message 400 of FIG. 4 includes information identifying a single purchased product (e.g., information 402 and 404) and information identifying two alternative products (e.g., information 406A, 406B, 408A, and 408B). The disclosed embodiments are, however, not limited to messages that identify single purchased products or multiple alternative products, and in additional embodiments, message 400 may display information identifying any additional or alternate number of purchased products (e.g., as identified by the transaction data obtained in step 312 of FIG. 3) or information identifying any additional or alternate number of alternative products (e.g., as identified in step 320 of FIG. 3) that would be appropriate to a display screen of client device 102.

In the embodiments described above, a transaction server associated with a financial institution (e.g., transactions server 142 of FIG. 1) may execute software processes to identify an alternative to a previously purchased product, and to provide information identifying the alternative product to a user. In certain aspects, the identification of the alternative product may allow the user to more fully appreciate the connection between his or her everyday purchases and those securities held within the user's investment portfolio, and further, to become more fully engaged with the management of his or her own investment portfolio.

The user may, however, desire an understanding of a relationship between a particular product (e.g., a good or service) and one or more securities held within his or her investment portfolio before purchasing the particular product. For instance, the user may be planning a weekly trip to a grocery store (e.g., a Safeway™ store in Washington, D.C.), and may prepare a shopping list that includes a number of products (e.g., Häagen-Dazs™ ice cream and Schick™ razors). In one embodiment, as described below in reference to FIG. 5, a user at a client device (e.g., one of client devices 102, 104, and 106 of FIG. 1) may access an online portal associated with a system of a financial institution (e.g., financial transaction system 140 of FIG. 1), and provide information specifying the various products within the shopping list.

The transaction server may be configured to provide to the user through the online portal (or other communication mechanisms), information identifying one or more alternative products that have similar product parameters (e.g., are similar in type, class, and/or sector) to the specified products, and further, that are related to one or more securities held within an actual or virtual investment portfolio of the user. In some embodiments, the transaction server may provide information identifying the alternative products such that the information provides a tangible connection between the user's everyday purchases and the composition of the user's investment portfolio. The disclosed embodiments may perform processes that allow the user to view the identified alternative products and plan purchases that are consistent with the positions held within the user's investment portfolios. In certain aspects, the disclosed embodiments may increase the user's engagement with their investment portfolio.

Figure 5:
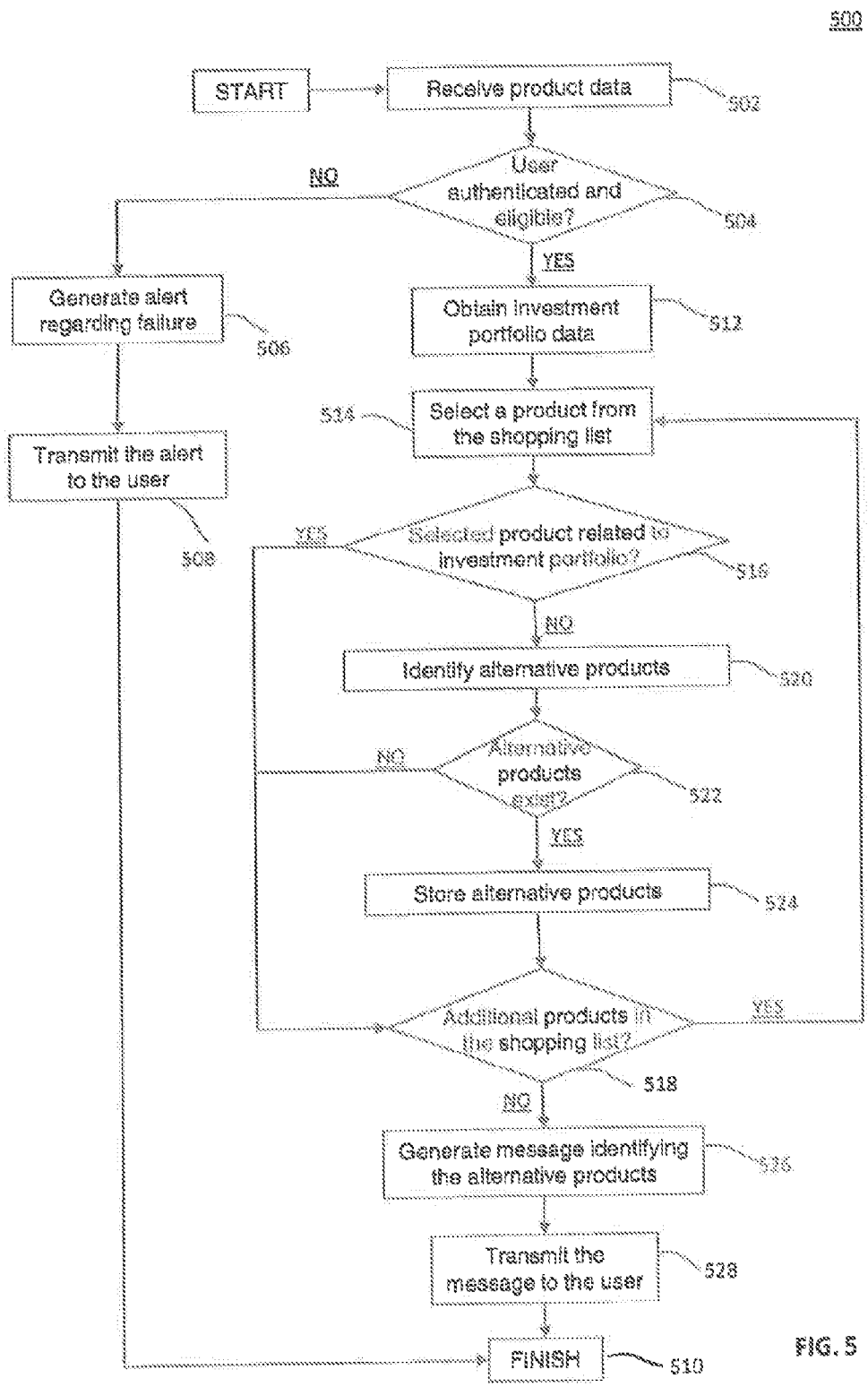
FIG. 5 is a flowchart of an exemplary method for identifying alternative products based on investment portfolio data, consistent with disclosed embodiments.

FIG. 5 illustrates an exemplary method 500 for identifying one or more alternative products based on investment portfolio data, in accordance with disclosed embodiments. In one embodiment, a server (or other computing device or system) associated with a financial institution (e.g., transaction server 142 of FIG. 1) may be configured to obtain information identifying one or more products of interest prior to purchase by the user (e.g., a shopping list of products compiled by the user). Transaction server 142 may be further configured to identify one or more alternative products that are associated with an investment portfolio of the user, and to transmit information identifying the alternative products to a client device of the user. In certain embodiments, the alternative products and the products of interest may be associated with a common product type, and the alternative products may be related to an issuer of one or more securities held within the user's investment portfolio.

In step 502, transaction server 142 may receive data identifying a list of one or more products of potential interest to a user. In certain embodiments, the listed products may corresponding to a shopping list prepared by the user in anticipation of a weekly shopping trip, and transaction server 142 may receive the listed products with a request from the user to obtain recommendations of alternative products consistent with the user's investment portfolio. By way of example, the listed products may include Häagen-Dazs™ ice cream and Schick™ razors.

In some embodiments, as described herein, the user at a client device (e.g., client device 102 of FIG. 1) may access a web page associated with the financial institution, and may enter one or more authentication credentials (e.g., a user name, a password, an account number, and a personal identification number) into the accessed web page. Upon entry of the authentication credentials, the user may also input information specified the one or more products into the accessed web page. Client device 102 may generate a request that includes the entered authentication credentials and the specified products, which client device 102 may transmit to transaction server 142 using one or more of the communications protocols outlined above.

Upon receipt of the request, transaction server 142 may execute software processes to authenticate the user in step 504. For example, as described herein, transaction server 142 may authenticate the user based on a comparison of the transmitted credentials and authentication credentials within stored user data (e.g., within customer data 144A of FIG. 1), a comparison of a source of the received request and a registered device of the customer, and through any additional or alternate technique appropriate to the customer, client device 102, and the financial institution. Further, as described herein, transaction server 142 may also determine in step 504 whether the user is eligible to receive alternative product recommendations based on the stored user data.

If transaction server 142 fails to authenticate the user or determines the user is ineligible (step 504; No), transaction server 142 generates an alert notifying the user of the failed authentication in step 506. In step 508, transaction server 142 may execute software processes to transmit the alert to client device 102 over network 120 using one or more of the communications protocols outlined above. Method 500 is then complete in step 510.

If, however, transaction server authenticates the user and determines the user is eligible to receive alternative product recommendations (step 504; Yes), transaction server 142 may obtain data corresponding to one or more actual and/or virtual investment portfolios associated with the user in step 512. In certain aspects, the securities held within the user's actual and/or virtual investment portfolios includes shares of common stock, corporate or governmental bonds, mutual funds, bond funds, exchange-traded funds (ETFs), various currencies, and other financial instruments.

For example, transaction server 142 may determine in step 512 that the user's actual investment portfolio includes corporate bonds and common stock issued by Unilever™, which provides Ben & Jerry's™ ice cream, Good Humor™ ice cream, Dove™ soap, and Axe™ body spray. Transaction server 142 may also determine in step 512 that the user's actual investment portfolio includes common stock issued by Proctor & Gamble™, which provides products such as Olay™ moisturizer and Gillette™ razors.

Referring back to FIG. 5, transaction server 142 may execute software instructions to select one of the listed products for analysis in step 514, and to determine in step 516 whether the selected product is related to one or more of the securities held within the user's actual or virtual investment portfolio. For instance, transaction server 142 may access and analyze information stored in one or more data storages (e.g., stored within data repository 144 and/or data repository 170 of FIG. 1) to identify a business entity (e.g., a manufacturer or a corporate parent) that provides the selected product. In an embodiment, transaction server 142 may determine an existence of a relationship between the selected product and the user's actual or virtual investment portfolio in step 516 based on a presence of securities issued by identified business entity within the user's actual or virtual investment portfolio.

If transaction server 142 determines that the purchased product is related to the user's actual or virtual investment portfolio (e.g., step 516; Yes), transaction server 142 determines that the existing relationship renders the determination of an alternative to the selected product unnecessary. In one aspect, method 500 may pass to step 518, and transaction server 142 executes software instructions to determine whether additional ones of the specified products require analysis. If transaction server 142 determines that an additional one of the specified products require analysis (e.g., step 518; Yes), method 500 may pass back to step 514, and transaction server 142 executes software instructions to select an additional one of the specified products for review.

If, however, transaction server 142 determines that a relationship does not exist (e.g., step 516; No), transaction server 142 may identify one or more alternative products in step 520. As described herein, the one or more alternative products may be similar to the identified product or products (e.g., sharing one or more of a common product type, class, and/or sector) and are related to one or more securities within the user's actual or virtual investment portfolio. Further, in some aspects, and as described above in reference to FIG. 3, transaction server 142 may also identify the alternative products based on location-based data associated with the user, information identifying loyalty and/or rewards programs in which the user participates, and information identifying a history of the user's purchase of one or more of previously identified alternative products.

For example, as described above in reference to FIG. 3, transaction server 142 may perform processes in step 520 that identify one or more business entities that issue the securities, and further, any additional business entities having relationships with the issuers (e.g., wholly-owned subsidiaries, partners, members of joint ventures, suppliers, members of a common supply chain, etc.). Transaction server 142 may also identify one or more candidate products provided by the issuers and/or the related business entities, and may identify relationships between the one or more candidate products and the selected product based on, e.g., product type information (e.g., ice cream), product class information (e.g., premium frozen desserts), and/or product sector information (e.g., dairy products). In an embodiment, transaction server 142 may identify one or more of the candidate products having corresponding relationships with the selected product as alternative products in step 520.

For example, as described herein, the user may have included a pint of Häagen-Dazs™ ice cream and Schick™ razors on the corresponding shopping list, and transaction server 142 may select Häagen-Dazs™ ice cream for analysis in step 514. In certain embodiments, transaction server 142 may execute software instructions to determine that General Mills™ represents a business entity providing Häagen-Dazs™ ice cream, and further, that the user's actual investment portfolio fails to include securities issued by General Mills™. Thus, transaction server 142 may determine in step 516 that the purchased product is not related to the user's actual investment portfolio, and transaction server 142 may identify in step 520 alternatives to the purchased Häagen-Dazs™ that might be related to the user's actual investment portfolio.

In some aspects, transaction server 142 may determine in step 520 that the user's actual investment portfolio includes securities issued by Unilever™, which provides Ben & Jerry's™ ice cream and Good Humor™ ice cream. Transaction server 142 may also determine that the purchased Häagen-Dazs™ ice cream is related to the Ben & Jerry's™ ice cream and the Good Humor™ ice cream, which are provided by Unilever™. In certain embodiments, transaction server 142 may identify Ben & Jerry's™ ice cream as an "alternative" to the selected Häagen-Dazs™ ice cream, based on a similarity in product type (e.g., ice cream) and relationship of Ben & Jerry's™ with an issuer of securities within the user's actual investment portfolio (e.g., Unilever™).

Similarly, for example, transaction server 142 may select Schick™ razors as a product for analysis, and may determine that Energizer™ represents a business entity providing Schick™ razors. As the user's actual investment portfolio does not includes securities issued by Energizer™, transaction server 142 may identify Gillette™ razors as an "alternative" to the selected Schick™ razors, based on a similarity in product type (e.g., razors) and a relationship between Gillette™ razors and an issuer of securities within the user's actual investment portfolio (e.g., Proctor & Gamble™).

Referring back to FIG. 5, transaction server 142 may determine in step 522 whether any alternatives to the purchased product were identified (e.g., in step 518). If transaction server 142 was unable to identify any alternatives to the selected product (e.g., step 522; No), transaction server 142 may determine in step 516 whether additional ones of the specified products require analysis. If transaction server 142 determines that the additional ones of the specified products require analysis (e.g., step 518; Yes), method 500 passes back to step 514, and transaction server 142 executes software instructions to select an additional one of the specified products for analysis.

If, however, transaction server 142 identified one or more alternatives to the selected product (e.g., step 522; Yes), transaction server 142 may execute software instructions in step 524 to store information identifying the one or more alternatives, as well as information that links the one or more alternatives to the selected product, within a corresponding data storage (e.g., customer data 144A of FIG. 1). For example, as described herein, transaction server 142 may store, in step 524, information identifying Ben & Jerry's™ ice cream as an alternative to Häagen-Dazs™ ice cream and information identifying Gillette™ razors as an alternative to the Schick™ razors.

Upon storing the identified alternatives, transaction server 142 may determine in step 518 whether additional ones of the specified products require analysis. If transaction server 142 determines that the additional ones of the specified products require analysis (e.g., step 518; Yes), method 500 passes back to step 514, and transaction server 142 executes software instructions to select an additional one of the listed products for review and analysis.

Alternatively, if transaction server 142 determines that each of the listed products have been analyzed (e.g., step 518; No), transaction server 142 may execute software instructions to generate a message identifying the alternative products in step 526. In one embodiment, the generated message may include information identifying each of the alternative products, a linkage between the alternate products and corresponding ones of the products specified by the user (e.g., within the shopping list) and additionally or alternatively, information highlighting the relationship between the alternative products and the user's actual or virtual investment portfolio.

In certain embodiments, the information identifying the alternative products may include graphical or visual representations of the alternative products. For example, the graphical or visual representations may include digital images of the packaging of the alternate products (e.g., an image of a carton of Ben & Jerry's™ ice cream), and additionally or alternatively, images of logos or mascots associated with business entities that provide the alternative products. The information identifying the alternative products may also include audio content associated with the identified products (e.g., advertising jingles, user testimonials, etc.). In one instance, the information identifying the alternative products may include video content that simultaneously provides the audio content and visual representations to the user.

In other embodiments, the information identifying the alternative products may identify one or more electronic and physical retailers that offer the alternative products for sale. For example, the information identifying the physical retailer may include a geographic location of the physical retailer, and further, may specify a location of the alternative product or products within the physical retailer.

Referring back to FIG. 5, in step 528, transaction server 142 may transmit the generated message to client device 102 across network 120 using any of the communications protocols described above. Exemplary method 500 then passes back to step 510, and exemplary method 500 is complete.

In some embodiments, transaction server 142 may generate a message in step 526 that includes textual information identifying the products within the shopping list and the one or more alternative products, as well as graphical representations that visually identify the listed products and the one or more alternative products to the user. Further, in additional embodiments, the generated message may identify one or more options for purchasing the alternative products from corresponding physical or electronic retailers (e.g., retailers associated with merchant system 150 in FIG. 1).

Figure 6:
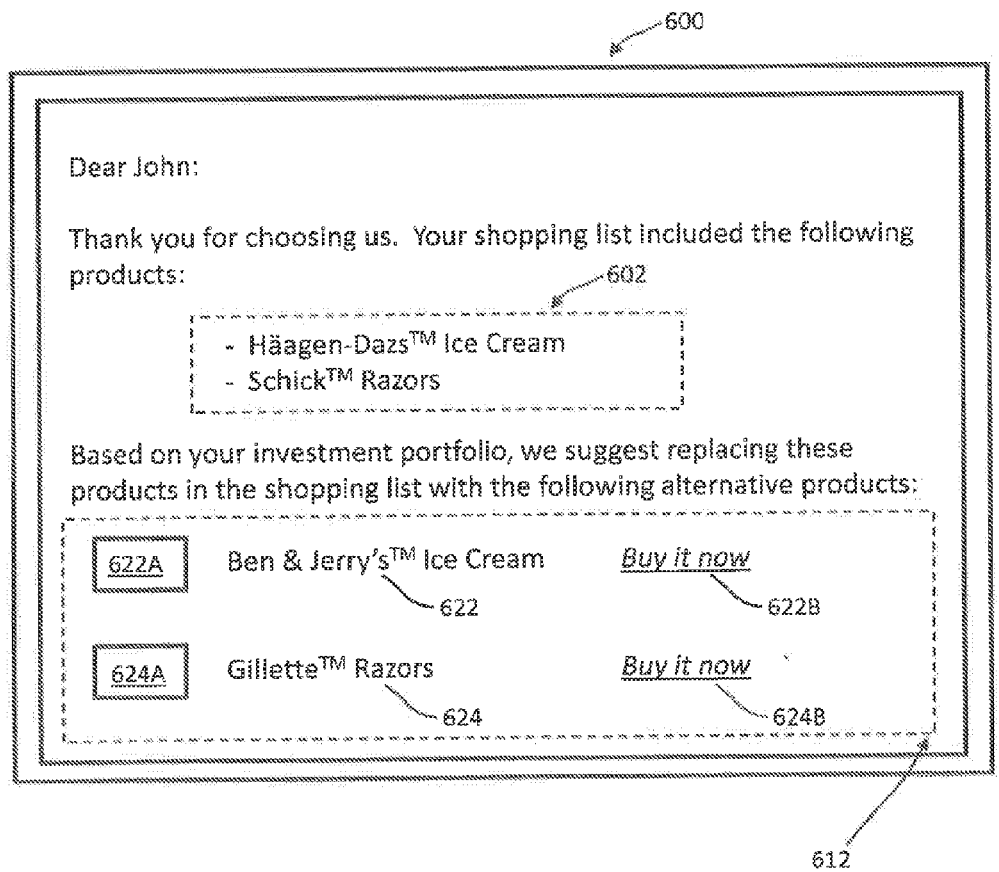
FIG. 6 is a diagram of an exemplary customer message, consistent with disclosed embodiments.

FIG. 6 illustrates an exemplary alternative product recommendations message 600, in accordance with disclosed embodiments. In such embodiments, a client device associated with the customer (e.g., client device 102 of FIG. 1) may receive message 600 from a transaction server associated with a financial institution (e.g., transaction server 142 of FIG. 1), and may execute software processes that render the received information for presentation within a corresponding display device of client device 102. For example, message 600 may be displayed within a portion of a web page associated with the financial institution (e.g., as accessed by the customer using a link delivered to the customer in an email message, text message, or instant message), or alternatively, message 600 may be displayed within a graphical user interface (GUI) of an application associated with the financial institution and executed by client device 102 (e.g., mobile banking application executed on a smartphone).

In FIG. 6, message 600 includes information 602 identifying the one or more elements of the user's shopping list (e.g., Häagen-Dazs™ ice cream and Schick™ razors), and region 612 identifying the one or more alternative products recommended to the user based on the shopping list and the user's actual investment portfolio. For example, message 600 includes alternative product recommendation 622 (e.g., Ben & Jerry's™ ice cream), a corresponding image 622A, and a link 622B that, upon selection, provides information identifying a retailer from which Ben & Jerry's™ ice cream may be purchased. Further, message 600 may also include alternative product recommendation 624 (e.g., Gillette™ razors), a corresponding image 624A, and a link 624B that, upon selection, provides information identifying a retailer from which Gillette™ razors may be purchased.

The disclosed embodiments are, however, not limited to messages that present information identifying two product alternate recommendations (e.g., message 600 of FIG. 6). In additional embodiments, message 600 may include fewer or additional alternative products for each of the products specified within the user's shopping list.

In further embodiments, a user of a client device (e.g., client device 102 of FIG. 1) may be browsing through items displayed at a location of a physical retailer (e.g., a physical retailer associated with merchant system 160 of FIG. 1). For example, the user may be interested in purchasing a pint of Häagen-Dazs™ ice cream, but may wish to understand whether this potential purchase is consistent with one or more securities held within the user's investment portfolio (e.g., the a retirement account).

In some embodiments, a user at a client device (e.g., one of client devices 102, 104, and 106 of FIG. 1) may capture an image of a product identifier (e.g., a SKU number, a UPC code, or a QR code) associated with a particular product of interest (e.g., a pint of Häagen-Dazs™ ice cream). Client device 102 may execute software instructions (e.g., associated with a mobile banking application associated with a financial institution) to generate a request to determine whether a purchase of the product of interest would be consistent with the user's investment portfolio. Client device 102 may transmit the request, which may include the information identifying the captured product identifier, to a transaction server associated with the user's financial institution (e.g., transaction server 142 of FIG. 1). As described below in reference to FIG. 7, transaction server 142 may determine whether a purchase of the product of interest is consistent with the user's investment portfolio, and if not, provide the user with alternative products in real time.

The disclosed embodiments may provide, in real time, information identifying alternative products that are similar to product of interest, and further, that are related to one or more securities held within an actual or virtual investment portfolio of the user. In some embodiments, the identification of the alternative products may illustrate a tangible connection between the user's everyday purchases and the composition of the user's investment portfolio. Further, the user may leverage the alternative products to plan purchases that are consonant with the positions held within the user's investment portfolios, thus increasing the user's engagement with investment portfolio.

Figure 7:
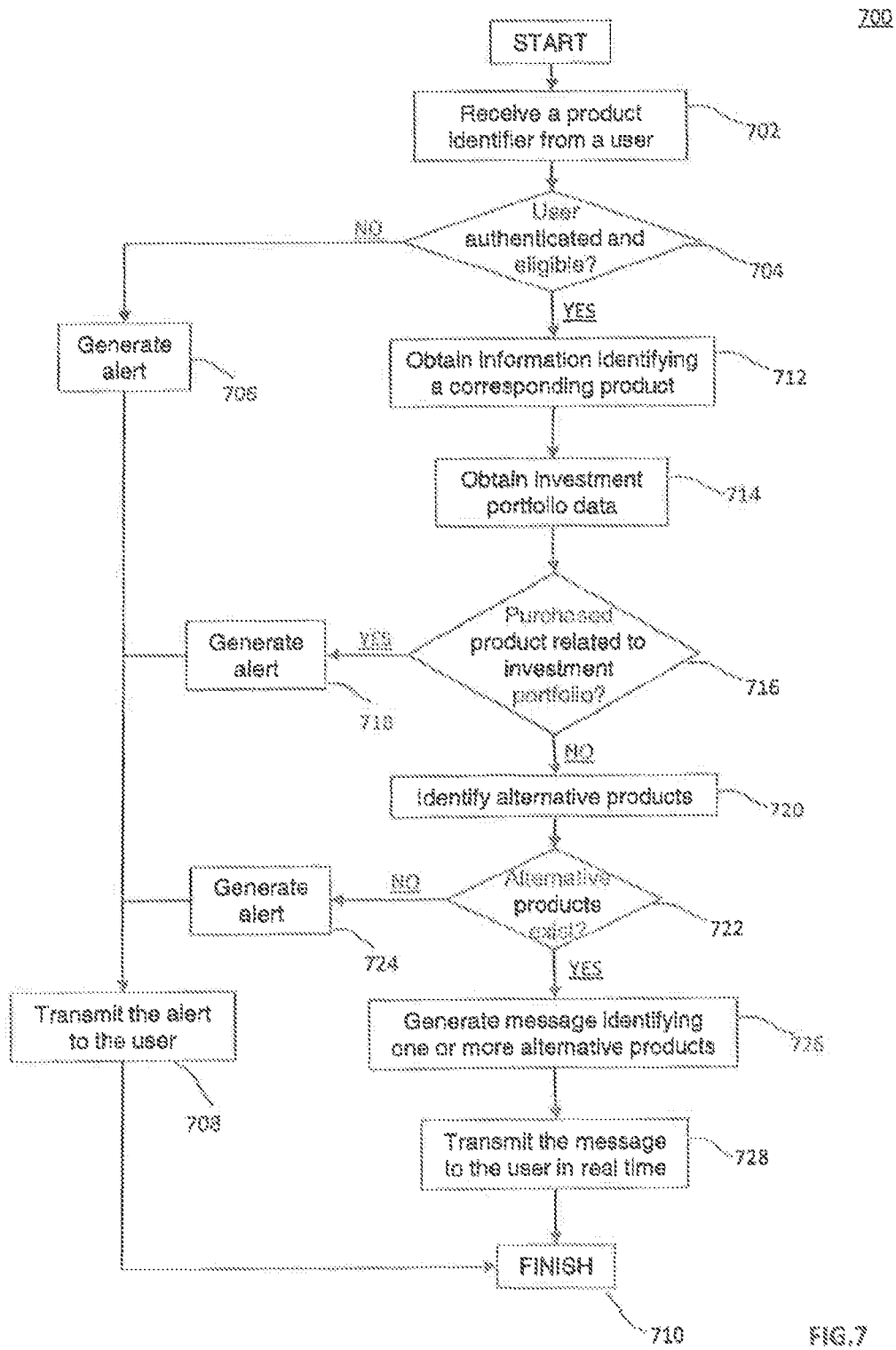
FIG. 7 is a flowchart of an exemplary method for identifying alternative products based on investment portfolio data, consistent with disclosed embodiments.

FIG. 7 illustrates an exemplary method 700 for identifying alternative products based on investment portfolio data, in accordance with disclosed embodiments. In one embodiment, a server (or other computing device or system) associated with a financial institution (e.g., transaction server 142 of FIG. 1) may be configured to identify a product of interest based on a product identifier received from a client device of user. Transaction server 142 may be further configured to identify an alternative product having a relationship with an investment portfolio of the user, and to transmit information identifying the alternative product to the client device. In certain embodiments, the alternative product and the purchased product may be associated with a common product type, class, or section, and the alternative product may be related to an issuer of one or more securities held within the user's investment portfolio.

In step 702, transaction server 142 receives a product identifier from a user at a client device (e.g., client device 102 of FIG. 1). As described herein, the user at client device 102 may execute a mobile banking application associated with a financial institution, and may enter one or more authentication credentials (e.g., a user name, a password, an account number, and a personal identification number) into the accessed web page. Further, as described herein, the user may capture an image of a product identifier (e.g., a SKU number, a UPC, and/or a QR code) using a still or video camera incorporated into client device 102. Client device 102 may generate a request that includes the entered authentication credentials and the product identifier, which client device 102 may transmit to transaction server 142 using one or more of the communications protocols outlined above.

Upon receipt of the request, transaction server 142 may execute software processes to authenticate the user in step 704. For example, as described herein, transaction server 142 may authenticate the user based on a comparison of the transmitted credentials and authentication credentials within stored user data (e.g., within customer data 144A of FIG. 1), a comparison of a source of the received request and a registered device of the customer, and through any additional or alternate technique appropriate to the customer, client device 102, and the financial institution. Further, as described herein, transaction server 142 may also determine in step 704 whether the user is eligible to receive alternative product recommendations based on the stored user data.

If transaction server 142 fails to authenticate the user or determines the user is ineligible (step 704; No), transaction server 142 generates an alert notifying the user of the failed authentication in step 706. In step 708, transaction server 142 may execute software processes to transmit the alert to client device 102 over network 120 using one or more of the communications protocols outlined above. Method 700 is then complete in step 710.

If, however, transaction server authenticates the user and determines the user is eligible to receive alternative product recommendations (step 704; Yes), transaction server 142 may execute software instructions to extract the product identifier from the received request, and in step 712, obtain information identifying a product (e.g., a good or service) that corresponds to the received product identifier. For example, the received product identifier may correspond to a UPC captured via a still or video camera incorporated into client device 102. In certain embodiments, transaction server 142 may access and analyze information stored in one or more data storages (e.g., data repository 144, data repository 154, server 160, and/or data repository 170 of FIG. 1) that enable it to determine a corresponding SKU number, and obtain information identifying the product of interest based on the SKU number.

For example, the user may have captured a UPC associated with a pint Häagen-Dazs™ ice cream, and transaction server 142 may determine a SKU number associated with the Häagen-Dazs™ ice cream. In certain embodiments, the SKU number may be linked to not only a brand identifier (i.e., Häagen-Dazs™) and a business entity that provides the product (e.g., General Mills™), but also to a product type (e.g., ice cream), a product class (e.g., premium frozen desserts), and a product sector (e.g., dairy products).

Referring back to FIG. 7, in step 714, transaction server 142 may obtain data corresponding to one or more actual and/or virtual investment portfolios associated with the user. For example, in step 714, transaction server 142 may access information identifying the actual and virtual investment portfolios held by the user (e.g., stored within portfolio data 144C of FIG. 1), and identify positions in one or more securities held in the user's actual and/or virtual investment portfolios. In one aspect, the securities held within the user's actual and/or virtual investment portfolios may include shares of common stock, corporate or governmental bonds, mutual funds, bond funds, exchange-traded funds (ETFs), various currencies, and other financial instruments.

For example, in step 714, transaction server 142 may access and analyze information stored in one or more data storages that enable it to determine that the user's actual investment portfolio includes corporate bonds and common stock issued by Unilever™, which provides products such as Ben & Jerry's™ premium ice cream, Good Humor™ ice cream, Dove™ soap, and Axe™ body spray. Transaction server 142 may also determine in step 314 that the user's actual investment portfolio includes common stock issued by Proctor & Gamble™, which provides products such as Olay™ moisturizer and Gillette™ razors.

In step 716, transaction server 142 may determine whether the identified product is related to one or more of the securities held within the user's actual and/or virtual investment portfolios. For example, transaction server 142 may execute software processes to identify a business entity (e.g., a manufacturer or a corporate parent) that provides the identified product. In certain embodiments, transaction server 142 may determine an existence of a relationship between the purchased product and the user's actual or virtual investment portfolio in step 716 based on a presence of securities issued by the identified business entity within the user's actual or virtual investment portfolio.

If transaction server 142 determines that the identified product is related to the user's actual or virtual investment portfolio (e.g., step 716; Yes), transaction server 142 may generate an alert in step 718 that identifies the relationship between the purchased product and the user's actual or virtual investment portfolio. In one aspect, transaction server 142 may transmit the generated alert to client device 102 in step 708 over network 120 using one or more of the communications protocols outlined above, and method 700 is then complete in step 710. In certain aspects, the transmitted alert may highlight, to the user in real time, a connection between the user's everyday purchases and the investment portfolios held by the user, and may foster increased engagement between the user and the user's investment portfolios.

If, however, transaction server 142 determines that a relationship does not exist between the identified product and the user's actual or virtual investment portfolios (e.g., step 716; No), transaction server 142 may identify one or more alternative products in step 720. In one example, the one or more alternative products may be similar to the identified product (e.g., share one or more of a common product type, class, and/or sector) and may be related to one or more securities within the user's actual or virtual investment portfolio. Further, in some aspects, and as described above in reference to FIG. 3, transaction server 142 may also identify the alternative products based on location-based data associated with the user, information identifying loyalty and/or rewards programs in which the user participates, and information identifying a history of the user's purchase of one or more of previously identified alternative products.

For example, in step 720, transaction server 142 may perform processes that identify one or more business entities that issue the securities held within the user's actual or virtual investment portfolios. In another embodiment, transaction server 142 may also identify one or more business entities that are associated with the issuers (e.g., wholly-owned subsidiaries, partners, members of joint ventures, suppliers, members of a common supply chain, etc.). In step 720, transaction server 142 may access and analyze information stored in one or more data storages to identify one or more candidate products provided by the issuers and/or the related business entities.

Further, in step 720, transaction server 142 may execute software instructions that determine relationships between the one or more candidate products and the purchased product based product type information (e.g., ice cream), product class information (e.g., premium frozen desserts), and product sector information (e.g., dairy products). In an embodiment, in step 720, transaction server 142 may select, as alternative products, one or more of the candidate products having corresponding relationships with the purchased product.

For example, as described herein, the user may be interested in purchasing a pint of Häagen-Dazs™ ice cream. In certain embodiments, transaction server 142 may execute software instructions to determine that General Mills™ represents a business entity providing Häagen-Dazs™ ice cream, and further, that the user's actual investment portfolio fails to include securities issued by General Mills™. Thus, transaction server 142 may determine in step 716 that the purchased product is not related to the user's actual investment portfolio, and transaction server 142 may identify in step 720 alternatives to the purchased Häagen-Dazs™ that might be related to the user's actual investment portfolio.

In some aspects, transaction server 142 may determine in step 720 that the user's actual investment portfolio includes securities issued by Unilever™, which provides Ben & Jerry's™ premium ice cream and Good Humor™ ice cream, and securities issued by Proctor & Gamble™, which provides products such as Olay™ moisturizer and Gillette™ razors. Transaction server 142 may also determine that the purchased Häagen-Dazs™ is related to the Ben & Jerry's™ ice cream the Good Humor™ ice cream provided by Unilever™. In such embodiments, transaction server 142 may identify Ben & Jerry's™ ice cream and Good Humor™ ice cream as "alternatives" to the purchased Häagen-Dazs™, based on a similarity in product type (e.g., ice cream), and a relationship between Ben & Jerry's™ ice cream and an issuer of the securities (e.g., Unilever™).

Referring back to FIG. 7, transaction server 142 may determine in step 722 whether any alternatives to the purchased product were identified (e.g., in step 720). In transaction server 142 was unable to identify any alternatives to the purchased product (e.g., step 722; No), transaction server 142 may generate an alert to the user indicating the failure to identify alternative products in step 724. Transaction server 142 may transmit the generated alert to client device 102 in step 708 over network 120 using one or more of the communications protocols outlined above, and method 700 is then complete in step 710.

If, however, transaction server 142 identified alternatives to the purchased product (e.g., step 722; Yes), transaction server 142 may execute software instructions to generate a message identifying one or more of the identified alternate products to the user in step 726. In one embodiment, the generated message may identify each of the alternative products, and additionally or alternatively, information highlighting the relationship between the alternative products and the user's actual or virtual investment portfolio. In other embodiments, transaction server 142 may select one or more of the alternative products for inclusion within the message based on, for example, assigned rankings indicating a degree of "similarity" between the identified product and corresponding ones of the alternative products.

Referring back to FIG. 7, in step 728, transaction server 142 may transmit the generated message to client device 102 across network 120 in real time using any of the communications protocols described herein. Exemplary method 700 then passes back to step 710, and exemplary method 700 is complete.

In certain embodiments, transaction server 142 may generate a message identifying one or more alternative products related to a purchased product, which may be transmitted to a client device 102) for presentation to the user (e.g., in step 328 of FIG. 3, in step 528 of FIG. 5, and/or in step 728 of FIG. 7). In some aspects, transaction server 142 may identify and provide to the user one or more incentives to purchase the alternate products. For example, based on the identification of Good Humor™ ice cream, which is provided by Unilever™, transaction server 142 may generate a retail coupon include a discount on the purchase of Good Humor™ ice cream and further, other products provided for sale by Unilever™. In some aspects, transaction server 142 may provide information identifying the retail coupon (e.g., enabling the user to display the retail coupon on client device 102 for use at a retailer, or to print the retail coupon using a device in communication with client device 102) within the transmitted message in step 328, in step 528, and/or in step 728.

In other aspects, and as a further incentive to purchase the alternative products, transaction server 142 may also provide the user with a rebate or discount on a purchase of securities issued by a corporate entity that provides or is related to one or more of the alternate products (e.g., as a manufacturer, distributor, retailer, etc.). For instance, based on the selection of Good Humor™ ice cream as an alternative product, transaction server 142 may waive a trading fee associated with the purchase of the securities issued by and Unilever™, and/or provide a discount or rebate on the purchase of these securities. As a further incentive to purchase the alternative products and to incorporate securities issued by Unilever™ in the user's investment portfolio, transaction server 142 may extend to the user an additional rebate on additional purchase of these securities during a predetermined further period of time (e.g., thirty days).

Further, for example, the issuance of retail coupons, trading rebates, and/or trading discounts may be temporally limited to reduce an ability of the user to "game the system" and obtain excessive quantities of incentives. In some aspects, transaction server 142 may be configured to issue a threshold number of retail coupons and other incentives to the user within a predetermine time period (e.g., five incentives per month).

In the embodiments described above, transaction server 142 may be configured to identify one or more alternate products similar to an identified product, (e.g., that share one or more of a common product type, class, and/or sector) and may be related to one or more securities within the user's actual or virtual investment portfolio. In further aspects, and in addition to identifying the alternative products, transaction server 142 may be further configured to identify one or more electronic and physical retailers that offer the alternative products for sale.

For example, and as described above, the user may have previously purchased Häagen-Dazs™ ice cream, and transaction server 142 may identify, as alternate products, Ben & Jerry's™ and Good Humor™ ice cream based on a product-based similarity and further, based on a presence in the user's investment portfolio of securities issued by Unilever™, which provides Ben & Jerry's™ and Good Humor™ ice cream. In some embodiments, transaction server 142 may also determine one or more retailers that offer the alternative products (e.g., the Ben & Jerry's™ and Good Humor™ ice cream) for sale, and may provide information identifying the alternative products and the determined retailers in messages for display to the user on client device 102 (e.g., in steps 328, 528, and 728 described above).

In one instance, transaction server 142 may obtain information associated with the user (e.g., user profile data, as stored in customer data 144A) to determine a home address of the user, and additionally or alternatively, a work address of the user. Transaction server 142 may, in some aspects, identify a plurality of candidate retailers that offer the Ben & Jerry's™ and Good Humor™ ice cream for sale, and may filter the candidate retailers based on a distance between the candidate retailers and the user's home and/or work addresses. In certain embodiments, transaction server may elect one of the more the candidate retailers disposed within a threshold distance (e.g., five miles) or a threshold travel time (e.g., ten minutes) of the user's home and/or work address.

In further aspects, transaction server 142 may be configured to select one or more of the candidate retailers for presentation to the user based on location-based data associated with the user. For example, as described above, transaction server may access and analyze location-based data associated with the user to determine that the Georgetown section of Washington, D.C., represents a geographic region of interest to the user, and further, that the user lives in the West Village neighborhood of Georgetown. Furthermore, transaction server 142 may determine that Safeway™ supermarkets located in Georgetown and Rosslyn, Va., a 7-Eleven™ convenience store located in DuPont circle, and a Giant™ supermarket in the Friendship Heights neighborhood of Washington, D.C., offer the Ben & Jerry's™ and Good Humor™ ice cream for sale and are disposed within the threshold distance and time of the user's home address and/or the user's geographic region of interest.

In view of the user's geographic preference for the Georgetown neighborhood of Washington, D.C., transaction server 142 may select the Safeway™ supermarket located in Georgetown as a retailer for presentation to the user, which may be provided to client device 102 with information identifying the alternative products (e.g., in steps 328, 528, and 728). Further, in some aspects, transaction server 142 may also provide client device 102 with information specifying driving directions between the Safeway™ supermarket and the user's home or office, and additionally or alternatively, a link to an external service (e.g., Google Maps™) capable of providing directions to the user. As described above, client device 102 may be configured to receive the transmitted message, and render the message for presentation to the user.

In other aspects, transaction server 142 may identify one or more electronic and physical retailers that offer the alternative products for sale based on loyalty program information associated with the user (e.g., as stored in account data 144B). For example, transaction server 142 may determine that the user participates in a loyalty program provided by Giant™ supermarkets, and in some aspects, may select the Giant™ supermarket in Friendship Heights, in addition to the Safeway™ supermarket located in Georgetown, as retailers of the alternative products. As described above, transaction server 142 may provide client device 102 with information identifying the alternative products and the selected Safeway™ and Giant™ supermarkets. Further, in some instances, the provided information may also indicate to the user that transaction server 142 selected the Giant™ supermarket as a retailer based on the user's participation in the rewards program.

As a further incentive to purchase the alternative products from the identified retailer, transaction server 142 may provide an enhanced reward or benefit within the loyalty program provided by the alternate retailer. For example, upon completion of a purchase of Good Humor™ ice cream from a Giant™ supermarket, transaction server 142 may identify a number of accrued points within the Giant™ supermarket loyalty program, and increment the accrued points by a standard amount, and additionally or alternatively, by an amount consistent with an enhanced benefit negotiated between the financial server and Giant™ supermarkets. Further, in some instances, transaction server 142 may provide additional rewards (e.g., free goods or services, special coupons, etc.) to the user within the loyalty program provided by Giant™ supermarkets.

In additional aspects, transaction server 142 may determine, based on the user's loyalty program information, that the user does not participate in a loyalty program provided by Safeway™ supermarkets. Transaction server 142 may, for example, provide client device 102 with an additional or alternate message recommending that the user enroll in the loyalty program provided by Safeway™ supermarkets. In some instances, the message, once rendered for presentation by client device 102, may provide user with a link enabling enrollment in the loyalty program. In other aspects, a business relationship may exist between the financial institution and Safeway™ supermarkets, and transaction server 142 may provide user information to a system associated with Safeway™ supermarkets (e.g., through an API across network 120), which may enroll the user in a "trial" membership in the loyalty program. Transaction server 142 may provide information to client device 102 alerting the user to the trial membership in the loyalty program provided by Safeway™ supermarkets, which client device 12 may render for presentation to the user.

In further instances, transaction server 142 may identify and provide to the user one or more incentives to purchase the alternate products at the identified retailer. For example, based on the identification of Good Humor™ ice cream, transaction server 142 may generate a retail coupon include a discount on the purchase of Good Humor™ ice cream at the identified retailer, e.g., the Safeway™ supermarket located in Georgetown.

In other instances, and as a further incentive to purchase the alternative products from the identified retailer, transaction server 142 may also provide the user with a rebate or discount on a purchase of securities issued by the retailer upon completion of a purchase transaction involving the alternative product at the identified retailer. For instance, based on a purchase by the user of Good Humor™ ice cream at a Safeway™ supermarket, transaction server 142 may waive a trading fee associated with the purchase of the securities issued by and Safeway™, and/or provide a discount or rebate on the purchase of these securities. In one aspect, transaction server 142 may generate a message (e.g., in steps 326, 526, and/or 726) that includes textual information identifying the product of interest (e.g., Häagen-Dazs™ ice cream) and the one or more alternative products (e.g., Ben & Jerry's™ ice cream and Good Humor™ ice cream bars), as well as graphical representations that visually identify the purchased product and the one or more alternative products to the user.

In one embodiment, client device 102 may receive the transmitted message in real time, and may execute software instructions to render the received message for presentation to the user within a corresponding interface displayed by, for example, the user's client device. The disclosed embodiments are, however, not limited to immediately displayed messages, and in additional embodiments, client device 102 may be configured to execute software that renders and displays the received message when client device 102 is disposed near one of the recommended products, e.g., within a physical location of a corresponding retailer.

For example, upon entering the location of the retailer, a server associated with merchant system 150 (e.g., merchant server 152 of FIG. 1) may establish contact with client device 102 using one or more of the communications protocols described herein. Merchant server 153 may transmit data to client device 102 identifying one or more products on display within the location, and additionally or alternatively, information that may enable client device 102 to locate the recommended product or products within the store. For example, the information may include, but is not limited, GPS information identifying various products within retailer, near field communication (NFC) tags associated various product locations within the retailer, and radio-frequency identification (RFID) information associated with various product locations within the retailer.

In some embodiments, client device 102 may receive the message from transaction server 142 identifying the one or more recommended products, and may execute software instructions that identify the one or more alternative products. Further, the software executed by client device 102 may enable client device 102 to determine that it is proximate to the one or more of the alternative products (e.g., using GPS signals, NFC tags, or RFID information), and to render the received message for display to the user on an interface presented on a display of client device 102. Further, in additional embodiments, the client device may generate an audible alert to the user that client device is proximate to one or more of the alternative products.

In certain aspects, a server associated with a financial system (e.g., transaction server 142 of FIG. 1) may perform one or more processes consistent with the disclosed embodiments to provide a user via a client device (e.g., client device 102 of FIG. 1) with information identifying one or more alternative products in real time. In other embodiments, the server may provide the user the information identifying one or more alternative products based on one or more detected conditions, such as when the user's client device (e.g., client device 102) is proximate to one or more of the recommended products within a location of a retailer. In one embodiment, the user's client device may execute software processes to render and subsequently display the identifying information (e.g., text and images) to the user on a corresponding display of the client device (e.g., client device 102).

In certain aspects, the user may view the one or more identified alternative products via their client device to identify the products while shopping at a retailer. In such instances, the user may have to locate the recommended products on the shelves or in other locations of the retailer. The disclosed embodiments includes methods and systems that assist a user in locating one or more alternative products that may be available in a retailer while the user is physically present in the retailer's location. For example, in some embodiments, client device 102 may include a wearable computing device that is configured to execute software instructions that generates and causes the display of information to locate the identified alternative products in a retailer location. In one example, client device 102 may be configured to generate information for display that includes a graphical overlay that provides information related to the user's surroundings. For example, client device 102 may include a wearable eyewear-based computing device the enables a customer to automatically receive product recommendations (e.g., one or more of the alternative products identified in accordance with the disclosed embodiments), in their own field of view, as they walk through a retail location.

In some embodiments, the wearable eyewear-based computing device may include an optical head-mounted display (OHMD) that, upon execution of software processes by a processor, displays information identifying recommended products within the field of view of the user. For example, the wearable eyewear-based computing device may receive information identifying a recommended product from a server associated with a financial institution (e.g., transaction server 142 of FIG. 1), may identify an image of the recommended product within the received information, and upon execution of one or more image recognition processes, may identify the recommended product within the user's field of view.

In such an embodiment, the OHMD of the wearable eyewear-based computing device may display a graphical overlay that visually distinguishes the recommended products from the surrounding portions of the field of view. For example, the recommended products may be highlighted using one or more predetermined colors and patterns, and additionally or alternatively, may be identified using one or more animated visual effects (e.g., by flashing colors and/or patterns). Further, in addition to highlighting the recommended products within the user's field of view, the OHMD of the wearable eyewear-based computing device may also present information identifying the recommended product, a price, various product attributes, and additionally or alternatively, a rationale for recommending the product (e.g., due to a relationship with a prior product and a security within an actual investment portfolio). In some embodiments, the wearable eyewear-based computing device may execute software instructions to facilitate the user's purchase of the recommended options (e.g., through a detected gesture or spoken input), to save the recommended options (e.g., in a "Favorites" list), or to remove the highlighted recommendation from the field of view.

In accordance with disclosed embodiments, a server associated with a financial institution (e.g., transaction server 142 of FIG. 1) may obtain transaction data indicative of one or more products previously purchased by the user, or one or more products of potential interest to the user prior to purchase (e.g., specified within a shopping list or captured in real time), and may identify one or more alternate products based on corresponding investment portfolio data. In additional embodiments, transaction server 142 may identify the one or more alternate products based on one or more products previously purchased by, or of interest to, a group of additional users (e.g., an "investment group") identified by the user or determined by transaction server 142. In an embodiment, the identified investment group may include, but is not limited to, the user's spouse or partner, a parent of the user, a grandparent of the user, a child of the user, and any additional or alternate family member identified by the user or by transaction server 142.

In one embodiment, the investment group may be demographically similar to the user. For example, transaction server 142 may identify members of the investment group based on profile data for the user (e.g., user data 144A of FIG. 1), and may include, but is not limited to, information identifying one or more individuals listed within an email or telephone contact list of the customer, information identifying friends of the user within corresponding social networking applications (e.g., Facebook™ and LinkedIn™), and information identifying one or more followers of the user within a micro-blogging application (e.g., Twitter™).

In additional embodiments, transaction server 142 may identify members of the investment group based on, for example, demographic characteristics of the user (e.g., age, income, and education level), the user's location, and one or more user preferences specified within the user profile data (e.g., user data 144A of FIG. 1). Additionally or alternatively, members of the investment group may share an investment risk tolerance similar to that of the customer, or alternatively, may share one or more transaction characteristics with the user (e.g., purchases from common retailer, purchases of common goods or services) or may be associated with a similar history of financial services transactions (e.g., that day trade in speculative securities). In such embodiments, transaction server 142 may access profile data for the user, may select one or more additional users associated with the financial institution for inclusion in the investment group, and may identify transaction data associated with not only the user in step 312, but also with members of the investment group.

As described above, transaction server 142 may leverage the transaction data obtained for the group to identify one or more suggested securities of potential interest to the user. Further, the investment risk tolerance for the user may also be determined in the basis of the risk tolerances for the group. Further, in both a virtual or actual investment portfolio, group information may be used by transaction server 142 to determine buy and/or sell decisions or recommendations. For example, if it has been observed that the user's peer group tends to refuel at Exxon™ and not Shell™, a recommendation could be made to purchase shares of Exxon™, and continue to watch the performance of shares of Shell™.

In the embodiments described above, transaction server 142 may be configured to obtain transaction data for a user, or alternatively, for a group associated with the user. In such embodiments, the obtained transaction data may include a hierarchy of information identify a corresponding good or service. For example, the obtained transaction data may include SKU level data that uniquely identify the good or service. If, however, the SKU level data is not available for a particular transaction, the obtained transaction data may include merchant level data (e.g., data identifying the merchant and types of merchandise sold by the merchant).

Further, the goods or services identified within the obtained transaction data may not be associated with a publicly traded security. For example, if SKU level information is provided that identifies a particular good or service manufactured by a privately held company, transaction server 142 may be unable to identify a corresponding security. In such an embodiment, transaction server 142 may identify a market sector associated with the particular good or service, and identify a corresponding security associated with the market sector (e.g., a sector-based mutual fund or exchange traded fund (ETF)).

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. A system, comprising:
a storage device; and
at least one processor coupled to the storage device, the storage device storing software instructions for controlling the at least one processor when executed by the at least one processor, and the at least one processor being operative with the software instructions and configured to:
receive, from a device of a user, first information comprising an image captured by the user device, the image comprising coded data representative of an identifier of at least one product;
determine, based on the coded data, the product identifier and a plurality of product parameters;
obtain second information identifying securities included within an investment portfolio of the user;
determine that the at least one product is not related to any of the securities within the investment portfolio of the user;
in response to the determination that the at least one product is not related to any of the securities, obtain third information identifying locations associated with a plurality of prior purchase transactions involving the user;
identify an alternative product that exhibits at least one of the plurality of product parameters, the alternative product having a relationship with an issuer of at least one of the securities;
based on the obtained third information, establish a geographic region that includes at least a threshold number of the prior purchase transactions involving the user;
identify a retailer within the established geographic region that offers the alternative product for sale;
transmit first information identifying the alternative product and the retailer to the user device, the first information instructing the user device to present, through an interface, a first graphical overlay that includes a first graphical or textual representation of the alternative product and the retailer prior to a purchase of the at least one product by the user, the first graphical overlay visually distinguishing the first graphical or textual representation from a display of a surrounding of the user visible to the user within the interface;

receive data indicative of a detection, by the user device, of a wireless signal broadcast by a proximity system maintained by the retailer, the proximity system being disposed within a threshold distance to a geographic position of the alternative product within the retailer;

based on the detected wireless signal, establish a proximity of the device to the geographic position of the alternative product within the retailer; and in response to the established proximity, transmit second information identifying the alternative product to the device, the second information instructing the device to present, through the interface, a second graphical overlay that includes a second graphical or textual representation of the alternative product prior to a purchase of the at least one product, the second textual or graphical representation being indicative of the proximity of the device to the geographic position of the alternative product within the retailer, and the second graphical overlay visually distinguishing the second graphical or textual representation from a display of a surrounding of the user visible to the user within the interface.

2. The system of claim 1, wherein:
the coded data comprises at least one of a QR code or bar code associated with the at least one product; and
the at least one processor is further configured to determine the product identifier prior to the purchase of the at least one product by the user, the product identifier comprising at least one of a name of the at least one product or an image of the at least one product.

3. The system of claim 1, wherein the at least one processor is further configured to:
obtain program data identifying a first loyalty program; and
identify a plurality of candidate retailers that offer the alternative product for sale;
determine that a relationship exists between a first corporate entity associated with the first loyalty program and a corporate entity associated with a first one of the candidate retailers; and
in response to the determination, establish the first candidate retailer as the identified retailer.

4. The system of claim 3, wherein the at least one processor is further configured to:
identify a second loyalty program available to the first user, the second loyalty program being associated with a corporate entity related to at least one of the alternative product or the identified retailer; and
transmit information identifying the second loyalty program to the user device.

5. The system of claim 3, wherein the at least one processor is further configured to:
identify a point balance associated with the first loyalty program; and
in response to a purchase of the alternative product from the identified retailer, perform processes that increase the point balance by a value determined in accordance with a rule established by the first loyalty program.

6. The system of claim 1, wherein the at least one processor is further configured to:

identify a plurality of candidate retailers that offer the alternative product for sale;
determine that a first one of the candidate retailers is disposed within a threshold distance or travel time of the geographic region; and
in response to the determination that the first condidate retailer is disposed within the threshold distance or travle time, establish the first candidate retailer as the identified retailer.

7. The system of claim 1, wherein the at least one processor is further configured to:
generate information identifying an incentive to purchase the alternative product from the identified retailer; and
transmit the generated purchase incentive information to the user device.

8. The system of claim 1, wherein the at least one processor is further configured to transmit, to the user device, information identifying an incentive to purchase securities issued by at least one of the identified retailer or a corporate entity associated with the alternative product.

9. The system of claim 1, wherein:
the at least one processor is further configured to identify the alternative product by obtaining first candidate products associated with at least one issuer of the securities; and
the at least one issuer comprises at least one of a manufacturer of a corresponding one of the first candidate products, a retailer of a corresponding one of the first candidate products, or a distributor of a corresponding one of the first candidate products.

10. The system of claim 9, wherein the at least one processor is further configured to:
determine that at least one of the first candidate products is associated with at least one product parameter; and
in response to the determination that the at least one first candidate products is associated with the at least one product parameter, select the alternative product from the at least one first candidate products.

11. The system of claim 9, wherein the at least one processor is further configured to:
identify a corporate entity related to the at least one issuer; and
obtain at least one second candidate product associated with the related corporate enity.

12. The system of claim 11 wherein the at least one processor is further configured to:
determine that at least one of the first and second candidate products is associated with the at least one product parameter; and
in response to the determination that the at least one of the first and second candidate products are associated with the at least one product parameter, select the alternative product from the at least one of the first and second candidate products.

13. The system of claim 1, wherein the at least one processor is further configured to identify a plurality of alternative products associated with at least one product parameter, the alternative products being related to at least one issuer of the securities included within the investment portfolio of the user.

14. The system of claim 1, wherein:
at least a portion of the prior purchase transactions involve one or more products purchased by the user;
the obtained third data comprises, for the one or more purchased products, at least one of retailer data, a product line, a product brand, a stock keeping unit number, a product name, a product image, a coded product identifier, a product size, a product price, or a product color; and the at least one processor is further configured to determine, based on the obtained third data, one or more of the product parameters associated with the at least one product.

15. The system of claim 1, wherein:

the user device comprises a wearable device and the transmitted first information instructs the wearable device to present information identifying the alternative product to the user.

16. A computer-implemented method, comprising:

receiving, from a device of a user, and using at least one processor, first information comprising an image captured by the user device, the image comprising coded data representative of an identifier of the at least one product;

based on the coded data, determining, using the at least one processor, the product identifier and a plurality of product parameters;

obtaining, using the at least one processor, second information identifying securities included within an investment portfolio of the user;

determining, using the at least one processor, that the at least one product is not related to the securities within the investment portfolio of the user;

in response to the determination that the at least one product is not related to the securities, obtaining, using the at least one processor, third information identifying a plurality of prior purchase transactions involving the user;

identifying, using the at least one processor, an alternative product that exhibits at least one of the plurality of product parameters, the alternative product having a relationship with an issuer of at least one of the securities;

based on the obtained third information, establishing, using the at least one processor, a geographic region that includes the locations associated with at least a threshold number of the prior purchase transactions involving the user;

identifying, using the at least one processor, a retailer within the established geographic region that offers the alternative product for sale; and transmitting, using the at least one processor, first information identifying the alternative product and the retailer to the user device, the information instructing the user device to present, through an interface, a first graphical overlay that includes a first graphical or textual representation of the alternative product and the retailer prior to a purchase of the at least one product by the user, the first graphical overlay visually distinguishing the first graphical or textual representation from a display of a surrounding of the user visible to the user within the interface;

receiving, using the at least one processor, data indicative of a detection, by the user device, of a wireless signal broadcast by a proximity system maintained by the retailer, the proximity system being disposed within a threshold distance to a geographic position of the alternative product within the retailer;

based on the detected wireless signal, establishing, using the at least one processor, a proximity of the device to the geographic position of the alternative product within the retailer; and in response to the established proximity, transmitting, using the at least one processor, second information identifying the alternative product to the device, the second information instructing the device to present, through the interface, a second graphical overlay that includes a second graphical or textual representation of the alternative product prior to a purchase of the at least one product, the second textual or graphical representation being indicative of the proximity of the device to the geographic position of the alternative product within the retailer, and the second graphical overlay visually distinguishing the second graphical or textual representation from a display of a surrounding of the user visible to the user within the interface.

17. The method of claim 16, wherein:

the coded data comprises at least one of a QR code or bar code associated with the at least one product; and the method further comprises determining the product identifier prior to the purchase of the at least one product by the user, the product identifier comprising at least one of a name of the at least one product or an image of the at least one product.

18. The method of claim 16, wherein identifying the retailer comprises:

obtaining program data identifying a first loyalty program; and identifying a plurality of candidate retailers that offer the alternative product for sale;

determining that a relationship exists between a first corporate entity associated with the first loyalty program and a corporate entity associated with a first one of the candidate retailers; and in response to the determination, establishing the first candidate retailer as the identified retailer.

19. The method of claim 18, further comprising:

identifying a second loyalty program available to the first user, the second loyalty program being associated with a corporate entity related to at least one of the alternative product or the identified retailer; and transmitting information identifying the second loyalty program to the user device.

20. The method of claim 18, further comprising:

identifying a point balance associated with the first loyalty program; and in response to a purchase of the alternative product from the identified retailer, performing processes that increase the point balance by a value determined in accordance with a rule established by the first loyalty program.

21. The method of claim 16, wherein identifying the retailer comprises:

identifying a plurality of candidate retailers that offer the alternative product for sale;

determining that a first one of the candidate retailers is disposed within a threshold distance or travel time of the geographic region; and in response to the determination that the first candidate retailer is disposed within the threshold distance or travel time, establishing the first candidate retailer as the identified retailer.

22. The method of claim 16, further comprising:

generating information identifying an incentive to purchase the alternative product from the identified retailer; and transmitting the generated purchase incentive information to the user device.

23. The method of claim 16, further comprising, transmitting, to the user device, information identifying an incentive to purchase securities issued by at least one of the identified retailer or a corporate entity associated with the alternative product.

24. The method of claim 16, wherein:
the product parameters comprise at least one of a product type, a product class, or a product sector; and
the method further comprises determining, based on transaction data corresponding to one or more products purchased by the user, at least one of the product parameters.

25. The method of claim 16, wherein:
identifying the alternative product comprises obtaining first candidate products having relationships with at least one issuer of the securities; an
the at least one issuer comprises at least one of a manufacturer of a corrseponding one of the first candidate products, a retailer of a corresponding one of th first candidater products, or a distributor of a corresponding one of the first candidate products.

26. The method of claim 25, wherein identifying the alternative product further comprises:
determining that at least one of the first candidate products exhibits at least one product parameter; and
in response to the determination that the at least one first candidate products exhibits the at least one product parameter, selecting the alternative product from the at least one first candidate products.

27. The method of claim 25, wherein the identifying the alternative product further comprises:
identifying a corporate entity related to the at least one issuer;
obtaining at least one second candidate product associated with the related corporate entity;
determining that at least one of the first and second candidate products exhibit at least one product parameter; and
in response to the determination that the at least one of the first and second candidate products exhibit the at least one product parameter, selecting the alternative product from the at least one of the first and second candidate products.

28. The method of claim 16, wherein:
at least a portion of the prior purchase transactions involve one or more products purchased by the user;
the obtained third data comprises, for the one or more purchased products, at least one of retailer data, a product line, a product brand, a stock keeping unit number, a product name, a product image, a coded product identifier, a product size, a product price, or a product color; and
the method further comprises:
determining, based on the obtained third data, one or more product parameters associated with the at least one product; and
identifying a plurality of alternative products associated with the at least one product parameter, the alternative products having relationships with at least one issuer of the securities included within the investment portfolio of the user.

29. The method of claim 16, wherein:
the user device comprises a wearable device and
the transmitted first information instructs the wearable device to present information identifying the alternative product to the user.

30. The system of claim 1, wherein the at least one processor is configured to:
detect a proximity of the user device to a geographic position of the alternative product within an additional retailer; and
in response to the detected proximity, transmit information identifying the alternative product and the additional retailer to the user device.

\* \* \* \* \*